US010868819B2

(12) United States Patent
Zhang et al.

(10) Patent No.: US 10,868,819 B2
(45) Date of Patent: *Dec. 15, 2020

(54) SYSTEMS FOR DETECTING A HEADLESS BROWSER EXECUTING ON A CLIENT COMPUTER

(71) Applicant: Shape Security, Inc., Mountain View, CA (US)

(72) Inventors: Bei Zhang, Mountain View, CA (US); Sergey Shekyan, Redwood City, CA (US)

(73) Assignee: SHAPE SECURITY, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,451

(22) Filed: May 15, 2019

(65) Prior Publication Data

US 2019/0268359 A1    Aug. 29, 2019

Related U.S. Application Data

(63) Continuation of application No. 14/859,084, filed on Sep. 18, 2015, now Pat. No. 10,298,599.

(Continued)

(51) Int. Cl.
*G06F 11/00* (2006.01)
*G06F 12/14* (2006.01)
(Continued)

(52) U.S. Cl.
CPC .......... *H04L 63/1416* (2013.01); *H04L 67/42* (2013.01); *H04L 63/1466* (2013.01)

(58) Field of Classification Search
USPC ........................................................ 726/23
See application file for complete search history.

(56) References Cited

U.S. PATENT DOCUMENTS 5,509,076 A   4/1996  Sprunk
6,654,707 B2  11/2003  Wynn
(Continued)

FOREIGN PATENT DOCUMENTS

CN     101471818     5/2011
WO  WO2008/095018    8/2008
(Continued)

OTHER PUBLICATIONS

NOA, mailed on Oct. 3, 2019, re: Marc R. Hansen, U.S. Appl. No. 15/202,755, filed Jul. 6, 2016.

(Continued)

*Primary Examiner* — Wasika Nipa
*Assistant Examiner* — Samuel Ambaye
(74) *Attorney, Agent, or Firm* — Troutman Pepper Hamilton Sanders LLP (Rochester)

(57) ABSTRACT

In an embodiment, a computer system is configured to improve security of server computers interacting with client computers through an intermediary computer, and comprising: a memory comprising processor logic; one or more processors coupled to the memory, wherein the one or more processors execute the processor logic, which causes the one or more processors to: intercept, from a server computer, one or more original instructions to be sent to a browser being executed on a client computer; inject, into the one or more original instructions, one or more browser detection instructions, which when executed cause one or more operations to be performed by an execution environment on the client computer and send a result that represents an internal state of the execution environment after performing the one or more operations to the intermediary computer; send the one or more original instructions with the one or more browser detection instructions to the browser; receive the result and (Continued)

determine whether the browser is a legitimate browser, or a headless browser, based, at least in part, on the result.

20 Claims, 5 Drawing Sheets

Related U.S. Application Data

(60) Provisional application No. 62/053,022, filed on Sep. 19, 2014.

(51) Int. Cl.
    *G06F 12/16*     (2006.01)
    *G08B 23/00*     (2006.01)
    *H04L 29/06*     (2006.01)

(56) References Cited

U.S. PATENT DOCUMENTS

| | | |
|---|---|---|
| 7,058,699 B1 | 6/2006 | Chiou |
| 7,107,347 B1 | 9/2006 | Cohen |
| 7,398,553 B1 | 7/2008 | Li |
| 7,424,720 B2 | 9/2008 | Chagoly |
| 7,464,326 B2 | 12/2008 | Kawai |
| 7,849,502 B1 | 12/2010 | Bloch et al. |
| 7,870,610 B1 | 1/2011 | Mitchell |
| 7,895,653 B2 | 2/2011 | Calo |
| 8,170,020 B2 | 5/2012 | Oliver |
| 8,195,953 B1 | 6/2012 | Yue |
| 8,453,126 B1 | 5/2013 | Ganelin |
| 8,555,388 B1 | 10/2013 | Wang |
| 8,561,193 B1 | 10/2013 | Srivastava |
| 8,578,499 B1 | 11/2013 | Zhu |
| 8,589,405 B1 | 11/2013 | Estan |
| 8,615,804 B2 | 12/2013 | Mui |
| 8,650,648 B2 | 2/2014 | Howard et al. |
| 8,677,481 B1 | 3/2014 | Lee |
| 8,689,330 B2 | 4/2014 | Sinn |
| 8,713,684 B2 | 4/2014 | Bettini |
| 8,726,394 B2 | 5/2014 | Maor |
| 8,739,284 B1 | 5/2014 | Gardner |
| 8,752,208 B2 | 6/2014 | Shulman |
| 8,762,962 B2 | 6/2014 | Ben-Artzi |
| 8,843,820 B1 | 9/2014 | Kay |
| 8,849,985 B1 | 9/2014 | Colton |
| 8,997,226 B1 | 3/2015 | Call |
| 9,043,924 B2 | 5/2015 | Maor |
| 9,158,893 B2 | 10/2015 | Call |
| 9,225,729 B1 | 12/2015 | Moen |
| 9,225,737 B2 | 12/2015 | Call |
| 9,258,328 B2 | 2/2016 | Ibatullin et al. |
| 9,456,050 B1 | 9/2016 | Lepeska |
| 9,537,888 B1 | 1/2017 | McClintock |
| 9,609,006 B2 | 3/2017 | Call |
| 9,628,498 B1 | 4/2017 | Aziz |
| 9,639,699 B1 | 5/2017 | Kurupati |
| 9,646,140 B2 | 5/2017 | Horadan |
| 9,680,850 B2 | 6/2017 | Rapaport |
| 9,686,300 B1 | 6/2017 | Kurupati |
| 9,705,902 B1 | 7/2017 | Call |
| 9,906,544 B1 | 2/2018 | Kurupati |
| 10,165,004 B1 | 12/2018 | Mehta |
| 2002/0194219 A1 | 12/2002 | Bradley |
| 2002/0199116 A1 | 12/2002 | Hoene |
| 2004/0088651 A1 | 5/2004 | McKnight |
| 2005/0108554 A1 | 5/2005 | Rubin |
| 2005/0172338 A1 | 8/2005 | Sandu |
| 2005/0198099 A1 | 9/2005 | Motsinger |
| 2005/0216770 A1 | 9/2005 | Rowett |
| 2005/0240999 A1 | 10/2005 | Rubin |
| 2005/0251536 A1 | 11/2005 | Harik |
| 2005/0278626 A1 | 12/2005 | Malik |
| 2006/0053295 A1 | 3/2006 | Madhusudan |
| 2006/0101047 A1 | 5/2006 | Rice |
| 2006/0174323 A1 | 8/2006 | Brown |
| 2006/0195588 A1 | 8/2006 | Pennington |
| 2006/0230288 A1 | 10/2006 | Fox |
| 2006/0288418 A1 | 12/2006 | Yang |
| 2007/0011295 A1 | 1/2007 | Hansen |
| 2007/0064617 A1 | 3/2007 | Reves |
| 2007/0088955 A1 | 4/2007 | Lee |
| 2007/0234070 A1 | 10/2007 | Horning |
| 2008/0208785 A1 | 8/2008 | Trefler |
| 2008/0320567 A1 | 12/2008 | Shulman |
| 2009/0070459 A1 | 3/2009 | Cho |
| 2009/0099988 A1 | 4/2009 | Stokes |
| 2009/0199297 A1 | 8/2009 | Jarrett |
| 2009/0241174 A1 | 9/2009 | Rajan |
| 2009/0292791 A1 | 11/2009 | Livshits |
| 2010/0088404 A1 | 4/2010 | Mani |
| 2010/0106611 A1 | 4/2010 | Paulsen |
| 2010/0142382 A1 | 6/2010 | Jungck et al. |
| 2010/0186089 A1 | 7/2010 | Fu |
| 2010/0218253 A1 | 8/2010 | Andrew |
| 2010/0235637 A1 | 9/2010 | Lu |
| 2010/0235910 A1 | 9/2010 | Ku |
| 2010/0287132 A1 | 11/2010 | Hauser |
| 2011/0035733 A1 | 2/2011 | Horning |
| 2011/0154308 A1 | 6/2011 | Lobo |
| 2011/0225234 A1 | 9/2011 | Amit |
| 2011/0231305 A1 | 9/2011 | Winters |
| 2011/0320816 A1 | 12/2011 | Yao |
| 2012/0036576 A1 | 2/2012 | Iyer |
| 2012/0090030 A1 | 4/2012 | Rapaport |
| 2012/0198528 A1 | 8/2012 | Baumhof |
| 2012/0254727 A1 | 10/2012 | Jain |
| 2012/0255006 A1 | 10/2012 | Aly et al. |
| 2012/0324236 A1 | 12/2012 | Srivastava |
| 2013/0047255 A1 | 2/2013 | Dalcher |
| 2013/0086679 A1 | 4/2013 | Beiter |
| 2013/0219492 A1 | 8/2013 | Call |
| 2013/0239195 A1 | 9/2013 | Turgeman |
| 2013/0263264 A1 | 10/2013 | Klein |
| 2013/0273882 A1 | 10/2013 | Walsh |
| 2014/0040051 A1 | 2/2014 | Ovick |
| 2014/0096194 A1 | 4/2014 | Bhogavilli |
| 2014/0101236 A1 | 4/2014 | Dietrich |
| 2014/0208198 A1 | 7/2014 | Ayoub |
| 2014/0298469 A1 | 10/2014 | Marion |
| 2014/0304816 A1 | 10/2014 | Klein |
| 2014/0310392 A1 | 10/2014 | Ho |
| 2015/0058992 A1 | 2/2015 | El-Moussa |
| 2015/0067031 A1 | 3/2015 | Acharya |
| 2015/0067866 A1 | 3/2015 | Ibatullin |
| 2015/0112892 A1 | 4/2015 | Kaminsky |
| 2015/0262183 A1 | 9/2015 | Gervais |
| 2015/0278491 A1 | 10/2015 | Horning |
| 2015/0281263 A1 | 10/2015 | McLaughlin |
| 2015/0358338 A1 | 12/2015 | Zeitlin |
| 2015/0379266 A1 | 12/2015 | McLaughlin |
| 2016/0005029 A1 | 1/2016 | Ivey |
| 2016/0072829 A1 | 3/2016 | Call |
| 2016/0119344 A1 | 4/2016 | Freitas Fortuna dos Santos |
| 2016/0191554 A1 | 6/2016 | Kaminsky |
| 2016/0342793 A1 | 11/2016 | Hidayat |
| 2016/0344769 A1 | 11/2016 | Li |
| 2016/0378989 A1 | 12/2016 | Park |
| 2017/0012960 A1 | 1/2017 | Idika |
| 2017/0013012 A1 | 1/2017 | Hansen |
| 2017/0048260 A1 | 2/2017 | Peddemors |
| 2017/0201540 A1 | 7/2017 | Call |
| 2017/0235954 A1 | 8/2017 | Kurupati |
| 2017/0237766 A1 | 8/2017 | Mattson |
| 2017/0257383 A1 | 9/2017 | Ficarra |
| 2017/0257385 A1 | 9/2017 | Overson |
| 2017/0293748 A1 | 10/2017 | Kurupati |
| 2018/0205747 A1 | 7/2018 | Ficarra |
| 2018/0255154 A1 | 9/2018 | Li |
| 2019/0081977 A1 | 3/2019 | Yang |
| 2019/0141064 A1 | 5/2019 | Call |
| 2019/0182251 A1 | 6/2019 | Jampani |
| 2019/0215304 A1 | 7/2019 | Yang |
| 2019/0245858 A1 | 8/2019 | Idika |

(56) References Cited

U.S. PATENT DOCUMENTS

| | | |
|---|---|---|
| 2019/0268359 A1 | 8/2019 | Zhang |
| 2019/0327265 A1 | 10/2019 | Zhao |
| 2019/0364019 A1 | 11/2019 | Yang |
| 2019/0373012 A1 | 12/2019 | Mattson |
| 2019/0394228 A1 | 12/2019 | Yang |

FOREIGN PATENT DOCUMENTS

| | | |
|---|---|---|
| WO | WO2008/095031 | 8/2008 |
| WO | WO2008/130946 | 10/2008 |
| WO | WO 2017/007705 | 1/2017 |
| WO | WO 2017/007936 | 1/2017 |
| WO | WO 2017/074622 | 5/2017 |

OTHER PUBLICATIONS

CTNF, mailed on Sep. 24, 2019, re: Ganesh Jampani, U.S. Appl. No. 16/259,890, filed Jan. 28, 2019.
NOA, mailed on Oct. 17, 2019, re: Michael J. Ficarra, U.S. Appl. No. 15/060,380, filed Mar. 3, 2016.
NOA, mailed on Dec. 3, 2019, re: Nwokedi Idika, U.S. Appl. No. 16/236,520, filed Dec. 30, 2018.
CTNF, mailed on Dec. 11, 2019, re: Siying Yang, U.S. Appl. No. 16/236,519, filed Dec. 30, 2018.
NOA, mailed on Dec. 11, 2019, re: Jarrod S. Overson, U.S. Appl. No. 15/059,080, filed Mar. 2, 2016.
U.S. Appl. No. 16/457,589, filed Oct. 24, 2019, Zhiwei Li.
NOA, mailed on Feb. 7, 2019, re: Siying Yang, U.S. Appl. No. 16/190,015, filed Nov. 13, 2018.
CTNF, mailed on Mar. 9, 2017, re: Siying Yang, U.S. Appl. No. 14/925,547, filed Oct. 28, 2015.
NOA, mailed on Apr. 23, 2015, re: Justin Call, U.S. Appl. No. 13/527,025, filed Jun. 19, 2012.
CTFR, mailed on Feb. 10, 2015, re: Justin Call, U.S. Appl. No. 13/527,025, filed Jun. 19, 2012.
CTNF, mailed on Nov. 2, 2012, re: Justin Call, U.S. Appl. No. 13/527,025, filed Jun. 19, 2012.
CTFR, mailed on Apr. 23, 2013, re: Justin Call, U.S. Appl. No. 13/527,025, filed Jun. 19, 2012.
CTNF, mailed on Aug. 4, 2014, re: Justin Call, U.S. Appl. No. 13/527,025, filed Jun. 19, 2012.
NOA, mailed on Jun. 1, 2015, re: Justin Call, U.S. Appl. No. 13/527,025, filed Jun. 19, 2012.
CTNF, mailed on Feb. 26, 2015, re: Justin Call, U.S. Appl. No. 14/055,576, filed Oct. 16, 2013.
NOA, mailed on Aug. 21, 2015, re: Justin Call, U.S. Appl. No. 14/055,576, filed Oct. 16, 2013.
CTNF, mailed on May 20, 2015, re: Justin Call, U.S. Appl. No. 14/110,659, filed Oct. 8, 2013.
NOA, mailed on Aug. 19, 2015, re: Daniel Moen, U.S. Appl. No. 14/160,107, filed Jan. 21, 2014.
CTNF, mailed on Jun. 27, 2014, re: Justin Call, U.S. Appl. No. 14/255,248, filed Apr. 17, 2014.
NOA, mailed on Nov. 19, 2014, re: Justin Call, U.S. Appl. No. 14/255,248, filed Apr. 17, 2014.
NOA, mailed on Dec. 24, 2014, re: Justin Call, U.S. Appl. No. 14/255,248, filed Apr. 17, 2014.
CTNF, mailed on Sep. 1, 2015, re: Ariya Hidayat, U.S. Appl. No. 14/293,895, filed Jun. 2, 2014.
NOA, mailed on Mar. 30, 2016, re: Ariya Hidayat, U.S. Appl. No. 14/293,895, filed Jun. 2, 2014.
NOA, mailed on Jul. 21, 2016, re: Siying Yang, U.S. Appl. No. 14/541,062, filed Nov. 13, 2014.
CTNF, mailed on Feb. 23, 2016, re: Siying Yang, U.S. Appl. No. 14/541,062, filed Nov. 13, 2014.
CTNF, mailed on May 8, 2015, re: Timothy Peacock, U.S. Appl. No. 14/570,632, filed Dec. 15, 2014.
NOA, mailed on Dec. 18, 2015, re: Timothy Peacock, U.S. Appl. No. 14/570,632, filed Dec. 15, 2014.
CTNF, mailed on Mar. 17, 2016, re: Justin Call, U.S. Appl. No. 14/672,879, filed Mar. 30, 2015.
CTNF, mailed on Nov. 10, 2016, re: Nwokedi Idike, U.S. Appl. No. 14/728,621, filed Jun. 2, 2015.
CTNF, mailed on Mar. 14, 2016, re: Justin Call, U.S. Appl. No. 14/874,717, filed Oct. 5, 2015.
NOA, mailed on Apr. 28, 2016, re: Justin Call, U.S. Appl. No. 14/874,717, filed Oct. 5, 2015.
NOA, mailed on Nov. 16, 2016, re: Justin Call, U.S. Appl. No. 14/980,409, filed Dec. 28, 2015.
CTNF, mailed on Aug. 2, 2016, re: Justin Call, U.S. Appl. No. 14/980,409, filed Dec. 28, 2015.
CTFR, mailed on Nov. 18, 2016, re: Justin D. Call, U.S. Appl. No. 14/672,879, filed Mar. 30, 2015.
CTNF, mailed on Jun. 1, 2017, re: Siying Yang, U.S. Appl. No. 14/942,769, filed Nov. 16, 2015.
CTNF, mailed on Jun. 2, 2017, re: Ariya Hidayat, U.S. Appl. No. 15/224,978, filed Aug. 1, 2016.
CTNF, mailed on Apr. 7, 2017, re: Yao Zhao, U.S. Appl. No. 14/861,906, filed Sep. 22, 2015.
CTNF, mailed on May 25, 2017, re: Daniel G. Moen, U.S. Appl. No. 14/980,231, filed Dec. 28, 2015.
CTNF, mailed on Jul. 26, 2017, re: Bei Zhang, U.S. Appl. No. 14/859,084, filed Sep. 18, 2015.
CTNF, mailed on Jun. 21, 2017, re: Zhiwei Li, U.S. Appl. No. 14/718,736, filed May 21, 2015.
CTNF, mailed on Aug. 30, 2017, re: Justin D. Call, U.S. Appl. No. 15/470,715, filed Mar. 27, 2017.
CTFR, mailed on Sep. 5, 2017, re: Siying Yang, U.S. Appl. No. 14/925,547, filed Oct. 28, 2015.
CTNF, mailed on Oct. 19, 2017, re: Jarrod S. Overson, U.S. Appl. No. 15/059,080, filed Mar. 2, 2016.
NOA, mailed on Oct. 25, 2017, re: Michael J. Ficarra, U.S. Appl. No. 15/060,322, filed Mar. 3, 2016.
CTNF, mailed on Nov. 13, 2017, re: Nwokedi Idike, U.S. Appl. No. 14/728,596, filed Jun. 2, 2015.
CTNF, mailed on Dec. 13, 2017, re: Justin D. Call, U.S. Appl. No. 15/645,787, filed Jul. 10, 2017.
NOA, mailed on Dec. 18, 2017, re: Yao Zhao, U.S. Appl. No. 14/861,906, filed Sep. 22, 2015.
NOA, mailed on Jan. 5, 2018, re: Yao Zhao, U.S. Appl. No. 14/861,906, filed Sep. 22, 2015.
NOA, mailed on Jan. 9, 2018, re: Justin D. Call, U.S. Appl. No. 15/470,715, filed Mar. 27, 2017.
CTFR, mailed on Jan. 25, 2018, re: Siying Yang, U.S. Appl. No. 14/942,769, filed Nov. 16, 2015.
CTNF, mailed on Feb. 7, 2017, re: Daniel G. Moen, U.S. Appl. No. 14/980,231, filed Dec. 28, 2015.
CTFR, mailed on Jan. 10, 2018, re: Bei Zhang, U.S. Appl. No. 14/859,084, filed Sep. 18, 2015.
NOA, mailed on Jan. 25, 2018, re: Zhiwei Li, U.S. Appl. No. 14/718,736, filed May 21, 2015.
CTNF, mailed on Mar. 30, 2018, re: Michael J. Ficarra, U.S. Appl. No. 15/060,380, filed Mar. 3, 2016.
CTNF, mailed on Apr. 19, 2018, re: Michael J. Ficarra, U.S. Appl. No. 15/919,034, filed Mar. 12, 2018.
CTNF, mailed on May 15, 2018, re: Marc R. Hansen, U.S. Appl. No. 15/202,755, filed Jul. 6, 2016.
CTFR, mailed on May 10, 2018, re: Nwokedi Idike, U.S. Appl. No. 14/728,596, filed Jun. 2, 2015.
CTNF, mailed on Feb. 16, 2018, re: Siying Yang, U.S. Appl. No. 15/068,468, filed Mar. 11, 2016.
NOA, mailed on May 18, 2018, re: Siying Yang, U.S. Appl. No. 14/942,769, filed Nov. 16, 2015.
CTNF, mailed on May 23, 2018, re: Bei Zhang, U.S. Appl. No. 14/859,084, filed Sep. 18, 2015.
CTFR, mailed on May 17, 2018, re: Jarrod S. Overson, U.S. Appl. No. 15/059,080, filed Mar. 2, 2016.
CTNF, mailed on Jun. 7, 2018, re: Siying Yang, U.S. Appl. No. 14/925,547, filed Oct. 28, 2015.
CTNF, mailed on Jun. 29, 2018, re: Timothy Dylan Peacock, U.S. Appl. No. 15/137,824, filed Apr. 25, 2016.

(56) References Cited

OTHER PUBLICATIONS

CTNF, mailed on Feb. 1, 2018, re: Nwokedi Idika, U.S. Appl. No. 15/204,710, filed Jul. 7, 2016.
NOA, mailed on Aug. 13, 2018, re: Daniel G. Moen, U.S. Appl. No. 14/980,231, filed Dec. 28, 2015.
NOA, mailed on Sep. 5, 2018, re: Daniel G. Moen, U.S. Appl. No. 14/980,231, filed Dec. 28, 2015.
NOA, mailed on Sep. 17, 2018, re: Siying Yang, U.S. Appl. No. 14/942,769, filed Nov. 16, 2015.
NOA, mailed on Sep. 5, 2018, re: Michael J. Ficarra, U.S. Appl. No. 15/919,034, filed Mar. 12, 2018.
NOA, mailed on Jul. 5, 2018, re: Siying Yang, U.S. Appl. No. 15/068,468, filed Mar. 11, 2016.
NOA, mailed on Sep. 19, 2018, re: Nwokedi Idika, U.S. Appl. No. 15/204,710, filed Jul. 7, 2016.
CTNF, mailed on Sep. 19, 2018, re: Eli Mattson, U.S. Appl. No. 15/430,224, filed Feb. 10, 2017.
CTFR, mailed on Sep. 11, 2018, re: Michael J. Ficarra, U.S. Appl. No. 15/060,380, filed Mar. 3, 2016.
CTFR, mailed on Nov. 1, 2018, re: Marc. R. Hansen, U.S. Appl. No. 15/202,755, filed Jul. 6, 2016.
CTFR, mailed on Nov. 30, 2018, re: Siying Yang, U.S. Appl. No. 14/925,547, filed Oct. 28, 2015.
NOA, mailed on Nov. 27, 2018, re: Nwokedi Idika, U.S. Appl. No. 15/204,710, filed Jul. 7, 2016.
CTNF, mailed on Oct. 5, 2018, re: Zhiwei Li, U.S. Appl. No. 15/968,573, filed May 1, 2018.
NOA, mailed on Sep. 12, 2018, re: Justin D. Call, U.S. Appl. No. 15/645,787, filed Jul. 10, 2017.
CTNF, mailed on Nov. 29, 2018, re: Jarrod S. Overson, U.S. Appl. No. 15/059,080, filed Mar. 2, 2016.
NOA, mailed on Jan. 3, 2019, re: Bei Zhang, U.S. Appl. No. 14/859,084, filed Sep. 18, 2015.
CTNF, mailed on Jan. 24, 2019, re: Nwokedi Idika, U.S. Appl. No. 14/728,596, filed Jun. 2, 2015.
NOA, mailed on Feb. 6, 2019, re: Eli Mattson, U.S. Appl. No. 15/430,224, filed Feb. 10, 2017.
NOA, mailed on Mar. 25, 2019, re: Siying Yang, U.S. Appl. No. 14/925,547, filed Oct. 28, 2015.
CTFR, mailed on Apr. 15, 2019, re: Jarrod S. Overson, U.S. Appl. No. 15/059,080, filed Mar. 2, 2016.
NOA, mailed on Mar. 11, 2019, re: Zhiwei Li, U.S. Appl. No. 15/968,573, filed May 1, 2018.
CTNF, mailed on May 15, 2019, re: Michael J. Ficarra, U.S. Appl. No. 15/060,380, filed Mar. 3, 2016.
NOA, mailed on Jun. 3, 2019, re: Siying Yang, U.S. Appl. No. 16/190,015, filed Nov. 13, 2018.
CTFR, mailed on Jul. 1, 2019, re: Nwokedi Idika, U.S. Appl. No. 14/728,596, filed Jun. 2, 2015.
CTNF, mailed on Sep. 4, 2019, re: Timothy Dylan Peacock, U.S. Appl. No. 15/137,824, filed Apr. 25, 2016.
CTNF, mailed on Aug. 14, 2019, re: Nwokedi Idika, U.S. Appl. No. 16/236,520, filed Dec. 30, 2018.
CTNF, mailed on Sep. 4, 2019, re: Justin D. Call, U.S. Appl. No. 16/234,848, filed Dec. 28, 2018.
CTNF, mailed on Sep. 4, 2019, re: Bei Zhang, U.S. Appl. No. 16/413,451, filed May 15, 2019.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 1, 2014, PCT/US14/24232.
International Search Report, dated Jun. 3, 2013, PCT/US13/26516.
DuPaul, Neil, "Common Malware Types: Cybersecurity 101", Veracode, Oct. 12, 2012, 9 pages, Oct. 12, 2012.
Friendly Bit, "Rendering a web page—step by step", published Jan. 11, 2010, pp. 1-2, Jan. 11, 2010.
"Custom Elements: defining new elements in HTML", Dec. 8, 2013, 15 pages, Dec. 8, 2013.

SYSTEMS FOR DETECTING A HEADLESS BROWSER EXECUTING ON A CLIENT COMPUTER

BENEFIT CLAIM

This application claims the benefit as a Continuation of U.S. patent application Ser. No. 14/859,084, filed Sep. 18, 2015, which claims the benefit under 35 U.S.C. 119(e) of provisional application 62/053,022, filed Sep. 19, 2014, the entire contents of which are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The present disclosure generally relates to security techniques applicable to client/server systems, and relates more specifically to techniques for detecting whether a client computer interacting with server computers through an intermediary computer is a headless browser (also referred to as a bot) or a browser operated by a legitimate user. SUGGESTED GROUP ART UNIT: 2447; SUGGESTED CLASSIFICATION: 709/217.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user indicating that the user selected an object defined in the instructions, a browser may send a request based on the selected object to the web server. The request may be a request for data or include data to be processed by the web server. For example, a browser may present a web page from a web server that defines a form, a user may enter data into one or more fields in the form, select a submit button. In response the browser may generate request that includes the data entered into the one or more fields, and send the request to the web server.

Attackers may use software, often referred to as a "bot" or "headless browser", which imitates a browser and a user by receiving instructions from a web server and autonomously generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters that correspond to fields in a web page to simulate a user submitting data to a web server through a browser.

Attackers may use bots to commit many types of unauthorized acts, crimes or computer fraud, such as web site or content scraping, ratings manipulation, fake account creation, reserving rival goods attacks, ballot stuffing attacks, password snooping, vulnerability assessments, brute force attacks, click fraud, DDoS attacks, bidding wars, and system fingerprinting attacks. As a specific example, a malicious user may cause a bot to traverse through pages of a web site and collect private or proprietary data, such as who is connected with whom on a particular social networking web site.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

Figure 1:
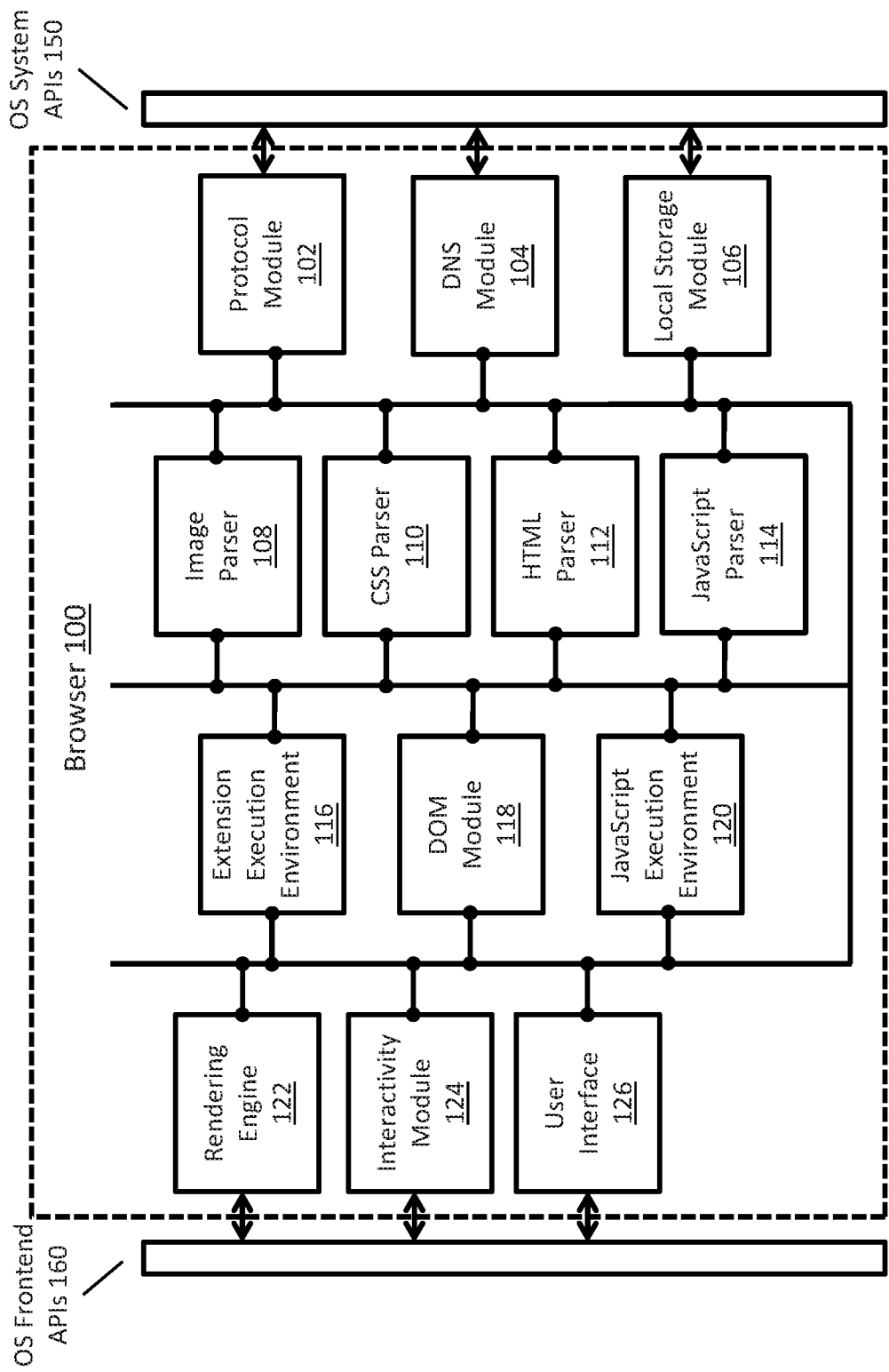
FIG. 1 illustrates functional units of a web browser.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 230 in FIG. 2 may be described with reference to several components illustrated in FIG. 3 and discussed in detail below, but using the particular arrangement illustrated in FIG. 3 is not required in other embodiments. Furthermore, while the instructions discussed in many example embodiments are HyperText Markup Language ("HTML") and JavaScript instructions, in other embodiments, the instructions intercepted and generated may be any other standard or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Words, such as "or", may be inclusive or exclusive unless expressly stated otherwise; a "set" may comprise zero, one, or more than one elements. For example, a set of instructions may comprise one or more instructions.

Embodiments are described herein according to the following outline:

1.0 General Overview
2.0 Browsers, Bots, and Attacks
   2.1 Example Browser Anatomy
   2.2 Example Bot or "Headless Browser" Anatomy
3.0 Distinguishing between Legitimate Browsers and Bots
   3.1 Implicitly Determining the Identity of a Browser
   3.2 Detection Tests
      3.2.1 Stack Traces
      3.2.2 Check for Predefined Browser Objects
      3.2.3 Attempt to Modify Protected Systems
      3.2.4 Check whether Plugins are Installed
      3.2.5 Check for Outdated Libraries
      3.2.6 Timing Suppression of an Alert
      3.2.7 Case Sensitive Header Checking or other Minor Differences
4.0 Example Network Topology that Detects whether a Browser is a Legitimate Browser or a Bot
   4.1 Web Infrastructure
   4.2 Intermediary Computer
      4.2.1 Protocol Client Logic
      4.2.2 Processing Logic
      4.2.3 Injection Logic
      4.2.4 Protocol Server Logic
      4.2.5 Bot Check Logic
      4.2.6 Reverse Logic
      4.2.7 Configurations
      4.2.8 Storage
   4.3 Browser
5.0 Process Overview
   5.1 Intercepting Instructions from a Content Server Computer
   5.2 Injecting Browser Detection Tests
   5.3 Determining whether a Browser is a Legitimate Browser or a Bot
      5.3.1 Testing with Dynamic Browser Detection Tests
   5.4 Responding to a Browser that is Determined to be a Bot
   5.5 Responding to a Browser that is Determined to be a Legitimate Browser
6.0 Implementation Mechanisms—Hardware Overview
7.0 Other Aspects of Disclosure 1.0 General Overview In an embodiment, a computer system is configured to improve security of server computers interacting with client computers through an intermediary computer, and comprises: a memory comprising processor logic; one or more processors coupled to the memory, wherein the one or more processors execute the processor logic, which causes the one or more processors to: intercept, from a server computer, one or more original instructions to be sent to a browser being executed on a client computer; inject, into the one or more original instructions, one or more browser detection instructions, which when executed cause one or more operations to be performed by an execution environment on the client computer and send a result that represents an internal state of the execution environment after performing the one or more operations to the intermediary computer; send the one or more original instructions with the one or more browser detection instructions to the browser; receive the result and determine whether the browser is a legitimate browser, or a headless browser, based, at least in part, on the result In the embodiment, the one or more operations are configured to cause the execution environment to, at least, generate a stack trace, and the result comprises the stack trace. In an embodiment, the one or more operations are configured to cause the execution environment to, at least, determine whether one or more objects are defined with one or more aliases, and the result comprises data that indicates whether the one or more objects are defined with the one or more aliases.

In an embodiment, the processor logic further causes the one or more processors to determine the browser is the legitimate browser if the result matches a previously stored result that is associated with the legitimate browser. In an embodiment, the processor logic further causes the one or more processors to determine the browser is the headless browser if the result matches a previously stored result that is associated with the headless browser.

In an embodiment, the processor logic further causes the one or more processors to, in response to determining the browser is a legitimate type of browser: store a set of identification data that identifies the browser and indicates that the browser is legitimate; receive one or more new instructions from the server computer to be sent to the browser; determine from the set of identification data that the browser is the legitimate browser, and in response, send the one or more new instructions without additional browser detection instructions. In an embodiment, the processor logic further causes the one or more processors to, in response to determining the browser is the headless browser: store a set of identification data that identifies the browser and indicates that the browser is the headless browser; receive a request for additional data from the browser; determine based, at least in part, on the set of identification data that the browser is the headless browser; terminate the request without sending it to the server computer.

In an embodiment, a computer system configured to improve security of server computers interacting with client computers through an intermediary computer, and comprising: a memory comprising processor logic; one or more processors coupled to the memory, wherein the one or more processors execute the processor logic, which causes the one or more processors to: intercept, from a server computer, a web page comprising HTML, CSS and JavaScript instructions to be sent to a browser being executed on a client computer; inject, into the web page, one or more browser detection JavaScript instructions, which when executed cause one or more operations to be performed by a JavaScript execution environment on the client computer and send a result that represents an internal state of the JavaScript execution environment after performing the one or more operations to the intermediary computer; send the web page with the one or more browser detection JavaScript instructions to the browser on the client computer; receive the result and determine whether the browser is a legitimate browser, or a headless browser, based, at least in part, on the result.

In an embodiment, a method for improving security of a server computer interacting with a client computer comprises: receiving, through a browser on the client computer from the server computer, one or more browser detection instructions, which when executed, generate a set of results that represent an internal state of an execution environment and identify the browser; executing the one or more browser detection instructions and generating the set of results; sending the set of results to the server computer; wherein the method is performed by one or more computing devices.

In an embodiment, a method for improving security of a server computer interacting with a client computer comprises: receiving, through a browser on the client computer from the server computer, one or more browser detection JavaScript instructions, which when executed by a JavaScript execution environment, generate a set of results that represent an internal state of the JavaScript execution environment and identify the browser; executing the one or more browser detection JavaScript instructions and generating the set of results; sending the set of results to the server computer; wherein the method is performed by one or more computing devices.

Embodiments discussed herein provide numerous benefits and improvements over the general idea of processing data from a client computer. The embodiments discussed here increase the resistance of server computers and database systems to computer attacks. For example, using the methods and system discussed herein, a server computer may detect or identify the browser, or type of browser, receiving a web page, processing the web page, and generating one or more requests based on the web page. A type of browser may include versions of a particular browser, one or more commercial browsers that are known to be legitimate, one or more browsers that are known to be legitimate bots (such as a search engine web crawler), one or more browsers that are known to be malicious bots, or any other set of browsers.

2.0 Browsers, Bots, and Attacks

A web browser may be a tool through which server-based application programs can provide client computers with content in a dynamic, custom UI. For example, in response to receiving a request for data from a web browser, a web server may respond with a set of instructions that define one or more objects with one or more object identifiers. The instructions may use the object identifiers to define how objects may be presented in a UI to enable human/computer interaction.

In contrast, bots traverse web pages or web sites to retrieve data from, or submit data to, one or more web servers with little, if any, human/computer interaction. For example, in response to receiving a request for data from a bot, a web server may respond with a set of instructions. A bot may parse the instructions to collect data from, or to store data in, particular objects with particular object identifiers. A bot may also make requests based on an object identifier, such as the identifier for a text field input. However, unlike a browser, a bot need not execute the instructions that define how objects should be presented in a UI because the bot is built to operate with little, if any, human/computer interaction. Thus, a bot may be a functionally-limited browser.

For convenience of expression, a set of instructions may be referred to herein as a file or web page. A set of instructions, file, or web page need not have a particular type or extension, and need not be stored in persistent storage. Furthermore a web page may comprises one or more files, each of which include one or more instructions for a browser to process or execute. While some files may be identified as a particular type of file or having a particular set of instructions, such as an "HTML file" or "JavaScript file", a file may include mixed content. For example, an HTML file may include HTML, JavaScript, Cascading Style Sheets ("CSS"), or any other standard or proprietary set of instructions. Furthermore, a file or web page need not be a file stored in persistent storage. A file or web page may be generated dynamically based on the one or more parameters in a request for the web page, data persistently stored in a database, or one or more parameters or configurations.

2.1 Example Browser Anatomy

FIG. 1 illustrates functional units of a web browser. Browser 100 may be a browser that is executed on a personal computer, used to communicate with or otherwise conceptually visit a web server, and operated by a user using the personal computer. Browser 100 is communicatively coupled with operating system ("OS") system application programming interface ("API") layer 150 and OS frontend API layer 160. Other embodiments may use other protocols, modules, or parsers.

Browser 100 comprises protocol module 102, domain name server ("DNS") module 104, local storage module 106, image parser 108, CSS parser 110, HTML parser 112, JavaScript parser 114, extension execution environment 116, document object model ("DOM") module 118, and JavaScript execution environment 120. Protocol module 102, DNS module 104, and local storage module 106 may send or receive data through OS System API layer 150. For example, protocol module 102 may send or receive data over any protocol, such as HTTP, to/from a server computer through OS system API layer 150. Data received through protocol module 102 may reference data sources by one or more domain names. DNS module 104 may resolve the one or more domain names referenced by interfacing with one or more remote domain name servers through OS system API layer 150. Local storage module may store or recall data from memory through OS system API layer 150.

Image parser 108, CSS Parser 110, HTML parser 112, and JavaScript parser 114 may parse data received through protocol module 102. HTML parser 112 may parse HTML data. CSS parser 110 may parse CSS data. JavaScript parser 114 may parse JavaScript data. Image parser 108 may parse image data. Each parser may generate or update objects in a DOM maintained by DOM module 118.

Browser 100 may comprise sets of program logic implementing one or more programmable engines, such as extension execution environment 116 and JavaScript execution environment 120. Extensions may be written one or more programming languages include JavaScript, Python, Ruby, or any other language. Each programmable engine may have access to DOM module 118 and may operate on one or more objects from a DOM maintained by DOM module 118. For example, JavaScript execution environment 120 may execute JavaScript parsed by JavaScript parser 114 and in response, create, update, or delete one or more objects managed by DOM module 118, or one or more aspects of a UI presenting the one or more objects.

Browser 100 comprises rendering engine 122, interactivity module 124, and user interface 126. Each of the components may cause, through OS frontend API layer 160, one or more objects to be presented to a user using a client computer. Rendering engine 122 may determine how objects are presented to a user. For example, rendering engine 122 may determine the color, shape, orientation, position, or any other visual or audio attribute of an image, text field, button, or any other object defined by a set of received instructions. Furthermore, rendering engine 122 may cause a button to be displayed on a monitor coupled to a client computer through OS frontend API layer 160.

User interface 126 may determine what may be presented to a user. For example, user interface 126 may determine that a "submit" button should be hidden until data has been entered in one or more text fields. After data has been entered in the one or more text fields, user interface 126 may notify rendering engine 122 to render the "submit" button accordingly.

Interactivity module 124 may receive one or more inputs through OS Frontend API layer 160. For example, in response to a user pressing a button on a mouse coupled to a client computer 299, the OS running on the client computer may send a message to interactivity module 124, through OS frontend API layer 160, to indicate that a user pressed a button on a mouse. Interactivity module 124 may determine that a user selected a particular button currently presented on a monitor. Interactively module 124 may notify user interface 126 or rendering engine 122 to update to update the UI accordingly.

2.2 Example Bot or "Headless Browser" Anatomy

A bot or "headless browser" may be a type of browser that includes a subset of the modules or features included in a browser used by a legitimate user, such as browser 100. For example, a bot may include protocol module 102, DNS module 104, local storage module 106, and HTML parser 112. A bot need not support a UI; thus, a bot need not include rendering engine 122, interactivity module 124, and user interface 126.

Less sophisticated bots need not include one or more parsers or execution environments. For example, a bot may be configured to look for data embedded in a DOM defined in one or more HTML documents. Accordingly, a bot may include an HTML parser, but need not include one or more parsers or execution environments, such as image parser 108, CSS parser 110, JavaScript parser 114, extension execution environment 116, or JavaScript execution environment 120.

More sophisticated bots may include one or more parsers or execution environments. For example, a more sophisticated bot may include a JavaScript engine or execution environment, such as JavaScript Execution Environment 120, which may be a run-time environment that executes JavaScript received from a web server.

3.0 Distinguishing Between Legitimate Browsers and Bots

As discussed herein, a bot may be used for various attacks against a server computer. If a web server can determine which browsers are bots and which browsers are used by legitimate users, then the web server can stop responding to the requests sent by bots and continue to respond to requests from browsers being used by legitimate users. Additionally or alternatively, a web server can attack the bot, or the client computer(s) executing the bot. However, determining whether a client software application, running on a client computer, is a bot or a browser operated by a legitimate user can be difficult. For convenience of expression, a browser operated by a legitimate user may be a type of browser referred to herein as a legitimate browser.

Some protocols, such as HTTP, allow for browsers and bots to identify themselves to a server. For example, a browser used by a legitimate user may include a header with an attribute called "user-agent" in a request for data sent to a server computer. The value associated with the "user-agent" attribute may identify the particular browser, type of browser, or bot sending the request. Ideally, a web server can determine whether the value associated with the user-agent attribute is a legitimate browser or a bot, and respond accordingly. For example, a web server may respond to a request from a legitimate browser with the data requested, and ignore a request from a bot. However, a malicious bot may spoof its identity by using the same value for the "user-agent" attribute as a legitimate browser.

3.1 Implicitly Determining the Identify of a Browser

While one or more browsers or bots may include the functional units discussed herein, each browser or bot may implement the functional units differently. Accordingly, execution environments in different browsers may a have a different internal state after parsing or executing the same instructions in the same web page. For example, after parsing or executing the same instructions, different execution environments may create different internal names for variables, objects, or functions. Because an execution environment is a component of a browser, "browser" or "execution environment" may be used interchangeably herein or in the provisional application that this application claims benefit of, and priority to.

One or more instructions may be included in a web page, which when executed by a browser (or execution environment in a browser), cause the browser generate output that describes the internal state of the browser. Since the internal state of the browser may be different for each browser, the output may be different for each browser. The output may be used as a fingerprint or signature to identify the particular browser or execution environment executing the one or more instructions. For convenience of expression, "detection instructions" or "browser detection instructions" may be one or more instructions that when executed by a browser cause the browser to generate a fingerprint or signature to identify the browser. Detection instructions may cause the output used to identify the browser to be sent to one or more server computers. Detection instructions may cause a browser to send the results from the browser detection test in a request for additional data, or separately or asynchronously with one or more requests from the browser for additional data, such as a different web page. A "detection test", or "browser detection test", may comprise detection instructions. Accordingly, including a detection test in a web page may mean including detection instructions in a web page.

For example, a particular set of instructions may cause a browser, or execution environment in a browser, to generate or raise a "type error". The browser may generate data indicating the source of the error, such as a text string that identifies each function in a series of functions called before executing the instruction(s) that caused the browser to raise the error. The text string generated by the browser can be different than another browser. By comparing the browser-generated text string with one or more text strings generated from one or more other browsers that have executed the same set of instructions, the browser may be identified as a particular browser, or type of browser.

Identifying a browser may include determining that a browser is not a particular browser or not a particular type of browser. For example, a browser that generates an output may be identified as not a particular browser because the output does not match the output expected from the particular browser running on a client computer.

Identifying a browser may include determining whether the browser is a particular type of browser, such as a legitimate browser or a bot. For example, a computer storage system may persistently store a repository of expected outputs from browsers that are legitimate or a repository of expected outputs from known bots. A server computer may receive output from a browser, and compare the received output to the repository of expected outputs from browsers that are legitimate. If the received output matches at least one output in the repository of expected outputs from legitimate browsers, then the server computer may determine the browser is a legitimate browser; otherwise, the server computer may determine that the browser is a bot. Additionally or alternatively, if the received output matches at least one output in the repository of expected outputs from known bots, then the server computer may determine the browser is a bot; otherwise, the server computer may determine that the browser is a legitimate browser.

A server computer, such as the intermediary computer or a web server computer discussed herein, may inject one or more browser detection instructions into a web page, which when executed by a browser produce output that identifies the browser or the client computer that the browser is being executed on, and sends the output to the server computer. The server computer may determine which browser, or which type of browser, is running on a client computer from the results, and respond positively or negatively. Additionally or alternatively, the server computer may determine which browser(s), or type(s) of browser, is not running on a client computer, and respond positively or negatively. If a server computer does not receive data from a browser based on detection instructions in a web page that is sent to a browser, then the server computer may determine that the browser is an unsophisticated bot and respond negatively. A negative response or action may be an action that is performed in response to determining that a browser is a bot, likely to be a bot, or not a legitimate browser. A positive response or action may be an action that is performed in response to determining that a browser is a legitimate browser, likely to be a legitimate browser, or not a bot. Many examples of negative responses and positive responses are discussed further herein.

3.2 Detection Tests

As discussed above with respect to the "user-agent" attribute, a bot may be configured to give a pre-programmed response to various inputs or cases to yield that same result as a legitimate browser. A server computer may inject detection instructions into a web page that when executed by a browser on a client computer cause the browser to perform one or more of the tests herein to implicitly determine which particular browser, or type of browser, is, or is not, being executed on the client computer. If a server computer adds detection instructions into a web page, and the server computer does not receive a response within a particular amount of time, or before the server computer receives one or more additional requests for data, then the server computer may determine that the browser is a bot.

Detection instructions added to a web page may cause a browser to perform one or more of the detection tests herein and report the results without causing the browser to notify, request permission from, or otherwise alert, a user using the browser that the detection instructions were added to the web page or that the browser will perform, is performing, or did perform detection tests. Furthermore, detection instructions need not request user input. Thus, a web server may inject detection instructions to a web page that allow a web server to determine whether a browser is a legitimate browser or a bot without lessening a legitimate user's experience with the browser or web page. For example, detection instructions need not cause an alert to be presented on a display with a button, which if selected may generate output indicating that a legitimate user is using the web page. Presenting an alert, especially one that requires the user to select a button, interrupts a user's experience with the web page.

3.2.1 Stack Traces

A stack trace identifies one or more functions that were called leading up to a particular instruction that is about to, is currently, or has recently been executed in a particular function. When an error occurs, or in response to an instruction requesting a stack trace, the browser may generate or return a stack trace. There are many ways a stack trace may be represented or returned. For purposes of illustrating clear examples herein, a stack trace will be represented as a text string that enumerates the names of one or more functions that were called before a particular instruction was executed or the line number of the particular instruction in the web page or file.

Each browser may generate stack traces differently. Even if two browsers both generate stack traces that are text strings, the text strings may be different. For example, Snippet 1 is a snippet of JavaScript code that may be embedded in HTML and SCRIPT tags, which when executed by a browser, causes the browser to raise an error called a "type error".

Snippet 1:

```
line 01:        try {
line 02:            null[0]( );
line 03:        }
line 04:        catch (error) {
line 05:            sendToServer(error.stack);
line 06:        }
```

The instructions in lines 1 through 3, of Snippet 1, when executed by a browser, or JavaScript execution environment in the browser, may cause the browser to raise a type error, which is caught by the block of instructions in lines 4 through 6. Accordingly, in response to executing line 2 in Snippet 7, the JavaScript execution environment may generate a stack trace from line 2, and create an error object named "error" that comprises the stack trace. The function called in line 5, "sendToServer", may be a function that sends data passed to the function in a parameter to a server computer. Accordingly, when a browser executes the instruction in line 5, the browser sends the stack trace the server computer.

Snippet 2 and Snippet 3 illustrate a character string representation of a stack trace generated by executing the code in Snippet 1 in a first browser and a second browser, respectively.

Snippet 2:

```
line 01:        TypeError: Cannot read property '0' of null
line 02:            at test.html:2
```

Snippet 3:

```
line 01:        @file:///C:/test.html:2:5
```

Snippet 2 and Snippet 3 are different because the different browsers generate the stack traces differently. However, two browsers that are the same may generate the same output in response to executing the code in Snippet 1.

Browsers that are similar, such as different versions of the same browser, may generate output that is identical or similar. A first output may be similar to a second output if the first output and the second output both include one or more of the same elements, even though the first output and the second output are not identical. For example, in line 2 of Snippet 2 and line 1 of Snippet 3, the number "2" represents the line number of the web page that included the JavaScript instruction that caused the browser to raise the type error ("null[0] ( );").

A first output may match a second output if the two outputs are identical or similar. A browser may be identified if the browser's output matches a previously generated output by a known browser.

The results shown in Snippet 2 and Snippet 3 were generated by executing the code in Snippet 1 at the root level (not wrapped in, or expressly called by, a function) in an HTML document. Accordingly, the stack traces in Snippet 2 and Snippet 3 are a string indicating the line number of the web page that included the JavaScript instruction that caused the browser to raise the type error ("null[0] ( );"). Malicious programmers may program their bots to spoof these results by looking for the line in a file that includes the code that will trigger the type error, generate a string that mirrors either Snippet 2 or Snippet 3 and replace the "2" in the string with the number of the line that has the JavaScript instruction that will cause the browser to raise the error.

To make spoofing harder, the JavaScript code that causes a browser or execution environment to generate various errors or stack traces may be included in multiple places in a web page. One or more of those multiple places may be in unreachable code; if a server computer receives, from a browser, a stack trace that identifies a line number of one of the one or more multiple places with unreachable code, then the server computer may determine that the browser is a bot that tried to spoof a stack trace.

Additionally or alternatively, the stack trace may be supplemented with additional data, such as an error message. Snippet 4 is a JavaScript code snippet that includes the JavaScript code in Snippet 1. However, in line 6 of Snippet 4, a message describing the error raised is sent to the server computer. Different browsers may generate different messages. Accordingly, the results sent to the server may be different.

Snippet 4:

| line 01: | try { |
| line 02: |     null[0]( ); |
| line 03: | } |
| line 04: | catch (error) { |
| line 05: |     sendToServer(error.stack); |
| line 06: |     sendToServer(error.message); |
| line 07: | } |

Snippet 5 and Snippet 6 show the message generated by executing the code in Snippet 4 in the first browser and the second browser, respectively.

Snippet 5:

| line 01: | Cannot read property '0' of null |

Snippet 6:

| line 01: | null has no properties |

The message in Snippet 5 was generated by the same, first browser that generated the stack trace in Snippet 2. The message in Snippet 6 was generated by the same, second browser that generated the stack trace in Snippet 3. If a server computer receives the stack trace in Snippet 2 and the message in Snippet 5, then the server computer may determine that the browser that sent Snippet 2 and Snippet 5 is the first browser. If a server computer receives the stack trace in Snippet 3 and the message in Snippet 6, then the server computer may determine that the browser that sent Snippet 3 and Snippet 6 is the second browser.

If a server computer receives mixed results, then the server computer may determine that the browser that sent the mixed results is a bot. For example, if a server computer receives the stack trace in Snippet 3 and the message in Snippet 6, which were generated by different browsers, then the server computer may determine that the browser that sent the stack trace in Snippet 3 and the message in Snippet 6 is a bot trying to spoof a legitimate browser.

Additionally or alternatively, the JavaScript code that causes a browser to generate one or more errors or stack traces may be embedded in one or more functions, which may make the stack traces more complex and harder to spoof. For example, Snippet 7 is a JavaScript code snippet that includes the JavaScript code in Snippet 1 embedded in a first function and a second function, "F1" and "F2", and then called.

Snippet 7:

| line 01: | (F2 = function( ) { |
| line 02: |     (F1 = function( ) { |
| line 03: |         try { |
| line 04: |             null[0]( ); |
| line 05: |         } |
| line 06: |         catch (error) { |
| line 07: |             sendToServer(error.stack) |
| line 08: |         } |
| line 09: |     })( ) |
| line 10: | })( ); |

Snippet 8 and Snippet 9 illustrate a stack trace generated by the code in Snippet 7 in the first browser and the second browser, respectively.

Snippet 8:

| line 01: | TypeError: Cannot read property '0' of null |
| line 02: |     at F1 (test2.html:4) |
| line 03: |     at F2 (test2.html:9) |
| line 04: |     at test2.html:10 |

Snippet 9:

| line 01: | F2/F1@file:///C:/test2.html:4:7 |
| line 02: | F2@file:///C:/test2.html:2:4 |
| line 03: | @file:///C:/test2.html:1:3 |

Although Snippet 8 and Snippet 9 are different, Snippet 8 and Snippet 9 both identify the line from which the browser raised the error: line 04 in Snippet 7. Snippet 8 and Snippet 9 also both identify the functions in the call chain that led to the JavaScript instruction (null[0]( );) that caused the browser to raise the type error: F1 and F2. Furthermore, both Snippet 8 and Snippet 9 identify the line numbers at which F1 and F2 are declared in Snippet 7: line 2 and line 1, respectively.

If a server computer receives the stack trace in Snippet 8, then the server computer may determine that the browser that sent Snippet 8 is the first browser. If the server computer receives the stack trace in Snippet 9, then the server computer may determine that the browser that sent Snippet 9 is the second browser. If the server computer receives a stack trace that is similar to Snippet 8 or Snippet 9 (e.g., identifies the same line numbers and function names as Snippet 8 and Snippet 9) and the first browser and the second browser that generated Snippet 8 and Snippet 9 were categorized as legitimate browsers, then the server computer may determine that the browser that sent the stack trace is legitimate.

If a server computer receives a stack trace that is identical to a stack trace generated by a browser that is known to be a bot, then the server computer may determine that the browser that sent the stack trace is a bot. In an embodiment, a server computer receives a stack trace that is not similar to any previously generated stack trace by a browser that is known to be a legitimate browser, then the server computer may pessimistically determine that the browser is a bot. In an embodiment, if a server computer receives a stack trace that is not similar to any previously generated stack trace by a browser that is known to legitimate browser or bot, then the server computer may optimistically determine that the browser is a legitimate browser that is not yet identified. Additionally or alternatively, the server computer may include additional detection instructions in one or more additional web pages sent to the browser that cause the browser to perform one or more of different, additional detection tests and report the results to determine whether the browser is a legitimate browser or a bot.

In the examples above, a stack trace was generated and sent to a server computer by causing the browser to execute JavaScript instructions that cause a JavaScript execution environment to raise a particular type of error—a type error. However, one or more other types of errors may also be used to cause the browser to generate a stack trace and send the stack trace to a server computer.

Stack traces may be generated and sent to a server computer without causing a browser interrupt a user using a web page. For example, a browser may execute instructions in a web page with Snippet 1, which causes the browser to raise an error, catch the error, generate a stack trace, and send the stack trace to a server computer without causing the browser to generate an alert or sound, request permission from a user, or execute any other mechanism that may notify, interrupt, or distract a user using the browser or the web page.

3.2.2 Check for Predefined Browser Objects

A server computer may inject detection instructions into a web page that causes a browser to determine whether one or more objects are defined with one or more aliases and report the result(s) to the server computer. Using the results, the server computer may determine that the browser is a particular browser, or type of browser.

A browser may have one or more predefined objects that are not predefined in one or more other browsers. An object may comprise one or more variables, functions, methods, data structures, or application programming interfaces. For example, a browser or a sophisticated bot may define an object with an alias that matches the name of the browser or a sophisticated bot. Accordingly, if a bot was named "BigBot", then the browser may define an object named, or aliased as, "BigBot".

A browser may execute one or more instructions that test whether one or more objects are defined and send the result to a server computer. The server computer may determine which particular browser, or type of browser, that the browser on the client computer may be, or may not be, and respond accordingly as discussed further herein. Snippet 10 is JavaScript code that may be used to determine whether a browser or execution environment has defined a particular object named "BigBot", accordingly to an embodiment.

Snippet 10:

```
line 01:     if(typeof BigBot === "undefined") {
line 02:         sendToServer("BigBot is undefined");
line 03:     }
line 04:     else {
line 05:         sendToServer("BigBot is defined");
line 06:     }
```

In Snippet 10, line 1, if an object aliased as "BigBot" is undefined in the browser executing Snippet 10, then control proceeds to line 2, otherwise control proceeds to line 5. If the browser executes line 2, then the browser may send data to a server computer indicating that there is no object defined and aliased as "BigBot". If, however, the browser executes line 5, then the browser may send data to a server computer indicating that there is an object defined and aliased as "BigBot".

If the server computer receives data indicating that "BigBot" is defined, then the server computer may determine that the browser is an instance of the "BigBot" browser, or not an instance of another browser; otherwise, the server computer may determine that the browser is not an instance of the "BigBot" browser. If the server fails to receive data from a browser indicating whether or not an object is defined and aliased as "BigBot", then the server computer may determine that the browser is an unsophisticated bot.

Objects may reference other objects. A particular object that is predefined by a particular browser may also reference one or more other predefined objects with one or more other predefined aliases. Therefore, the detection instructions in a web page may test an object to see if the object also has the expected one or more predefined references to the expected one or more predefined objects. The instructions may cause the browser to report the results to the server computer. If the server computer determines that the one or more other predefined objects with the one or more predefined aliases are defined, then the server computer may determine that the browser is the suspected browser; otherwise, the server computer may determine that the browser is a bot or not the suspected browser.

Causing a browser to determine whether an object has a particular alias and reporting the results, need not cause the browser to show an alert to, request permission from, or otherwise notify a legitimate user using the browser or the web page that the detection instructions were added to the web page or executed. For example, causing a browser to execute the instructions in Snippet 7 need not cause the browser to present an alert to a legitimate user indicating that the code is Snippet 7 is being performed or that the particular predefined object is, or is not, defined or aliased.

3.2.3 Attempt to Modify Protected Systems

A server computer may inject detection instructions into a web page that is sent to a browser, which when executed by the browser on a client computer, causes the browser to violate one or more protection mechanisms in legitimate browsers and report the result to the server computer. The server computer may determine which particular browser, or type of browser, that the browser on the client computer may or may not be based on the result.

Legitimate browsers may restrict web pages from having access to the files or directories to which data can be written to, or read from, without notification or permission from a user. Bots, however, may allow web pages to have access to files or directories that would normally be restricted without notifying a user. For example, a server computer may inject one or more instructions into a web page, which when executed by a browser, attempt to cause the browser to write dummy data to a file in a root directory on a client computer, attempt to read the dummy data back from the file, and send the read dummy data back to the server computer without requesting authorization from a user or following one or more security protocols. If the server computer receives the dummy data, then the server computer may determine that the browser is a bot. Additionally or alternatively, if the server computer does not receive the dummy data, then the server computer may determine that the browser is a legitimate browser.

3.2.4 Check Whether Plugins are Installed

A server computer may inject detection instructions into a web page that is sent to a browser, which when executed by the browser on a client computer, causes the browser to determine which plugins, if any, are installed in the browser, and report the result to the server computer. The server computer may determine which particular browser, or type of browser, that the browser on the client computer may or may not be based on the result.

Legitimate browsers may have one or more plugins installed. Bots, however, need not have any plugins installed. For example, a legitimate browser may have a video plugin installed for a user to watch video. In response to receiving data that a browser does not have any plugins installed, the server computer may determine that the browser is a bot. Additionally or alternatively, in response to receiving data that a browser has one or more plugins installed, the server computer may determine that the browser is a legitimate browser. If the server computer receive data that a browser has a particular plugin that is only available for a particular browser or type of browser, then the server computer may determine that the browser that sent the data is an instance of the particular browser or type of browser.

3.2.5 Check for Outdated Libraries

A server computer may inject detection instructions to a web page that is sent to a browser, which when executed by the browser on a client computer, causes the browser to determine which libraries are installed, if any, and report the result to the server computer. The server computer may determine which particular browser, or type of browser, that the browser on the client computer may or may not be based on the result.

Legitimate browsers may have may have up-to-date libraries installed to support one or more new features or plugins that present data to a user. Bots may have older libraries, if any, since a bot need not perform the latest features to display content to users. Accordingly, in response to receiving data that a browser has one or more libraries installed that were released before a particular date or time, the server computer may determine that the browser is a bot. Additionally or alternatively, in response to receiving data that a browser has one or more libraries installed that were not released within a particular amount of time, the server computer may determine that the browser is a bot. Additionally or alternatively, in response to receiving data that a browser has one or more libraries installed that were released after a particular date or time, the server computer may determine that the browser is a legitimate browser. Additionally or alternatively, in response to receiving data that a browser has one or more libraries installed that were released within a particular amount of time, the server computer may determine that the browser is a legitimate browser.

3.2.6 Timing Suppression of an Alert

A server computer may inject detection instructions to a web page that is sent to a browser, which when executed by the browser on a client computer, causes the browser to display an alert, record the amount of time that elapses before the alert is suppressed, and report the amount of time to the server computer. The server computer may determine which particular browser, or type of browser, that the browser on the client computer may or may not be based on the amount of time.

A bot may suppress an alert very quickly, because the bot need not display the alert and need not process the contents or context of the alert to determine whether to suppress the alert. Additionally or alternatively, a bot need not trigger the alert, or may continue to perform one or more operations without waiting for the alert to be suppressed.

In contrast, if an alert is presented to a legitimate user, the browser must take time to render the alert on a display. Furthermore, a user may take time to read the content of the alert, determine based on the context when, or which input or button to select, to suppress the alert, or close the alert to continue to use the web page. Accordingly, a legitimate user may take at least a particular amount of time to process the alert before suppressing the alert.

In response to receiving data indicating that an alert was suppressed at or before a minimum amount of time by a browser, a server computer may determine that the browser is a bot. Additionally or alternatively, in response to receiving data indicating that an alert was suppressed at or after a minimum amount of time, a server computer may determine that the browser is a legitimate browser. Additionally or alternatively, in response to receiving data indicating that an alert was not suppressed after a maximum amount of time, the server computer may determine that the browser is a bot.

3.2.7 Case Sensitive Header Checking or Other Minor Differences

A server computer may receive data from a browser that is slightly different from other browsers. In some cases, a server computer to determine whether a browser on the client computer is, or is not, a particular browser, or a particular type of browser, based on a slight difference in data or content generated by the browser on the client computer.

For purposes of illustrating a clear example, assume a request header sent from a bot may capitalize the words "keep-alive", whereas a legitimate browser does not. Accordingly, if a server computer receives a request header from a browser with the words uppercased ("Keep-Alive"), then the server computer may determine that the browser is a bot. Additionally or alternatively, if the server computer receives a request header from a browser with the words lowercased ("keep-alive"), then the server computer may determine that the browser is a legitimate browser.

Figure 2:
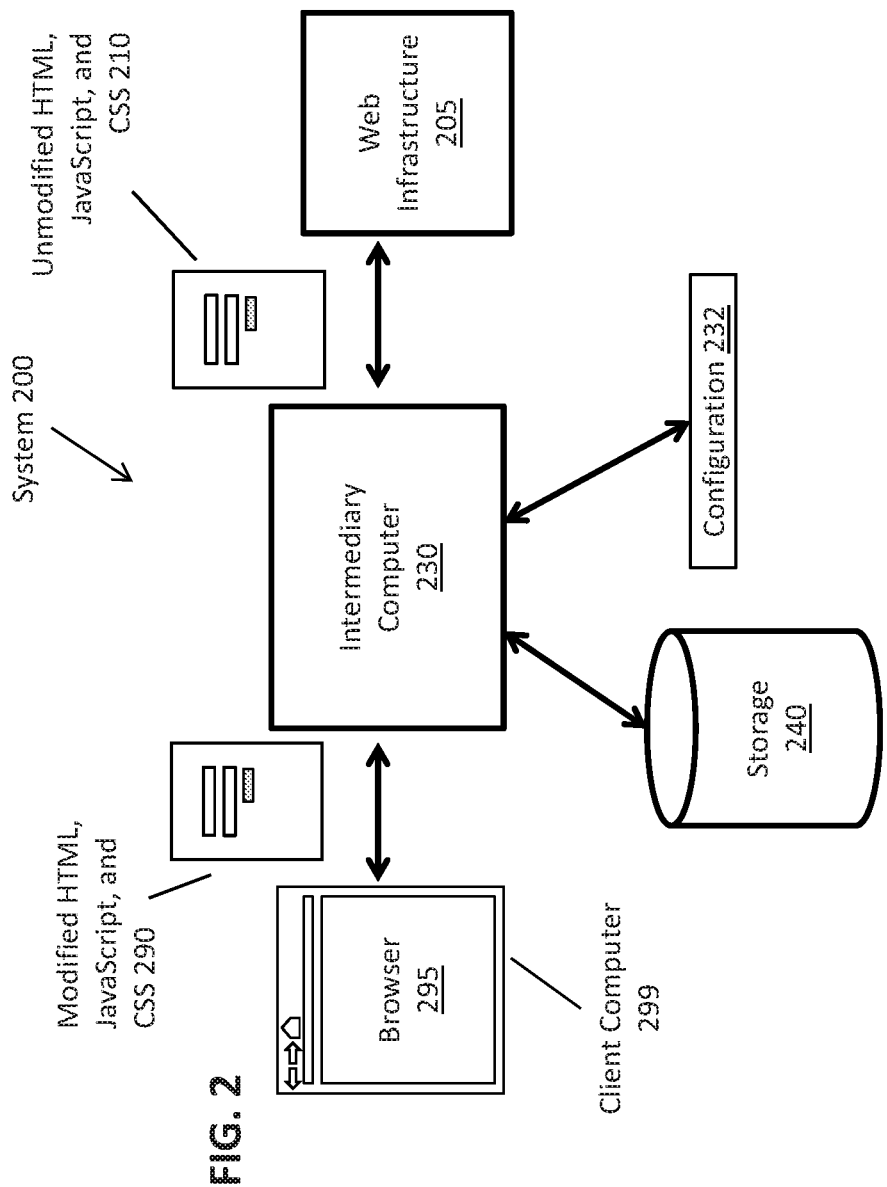
FIG. 2 illustrates a computer system comprising a browser, an intermediary computer, and a web infrastructure in an example embodiment.
Figure 3:
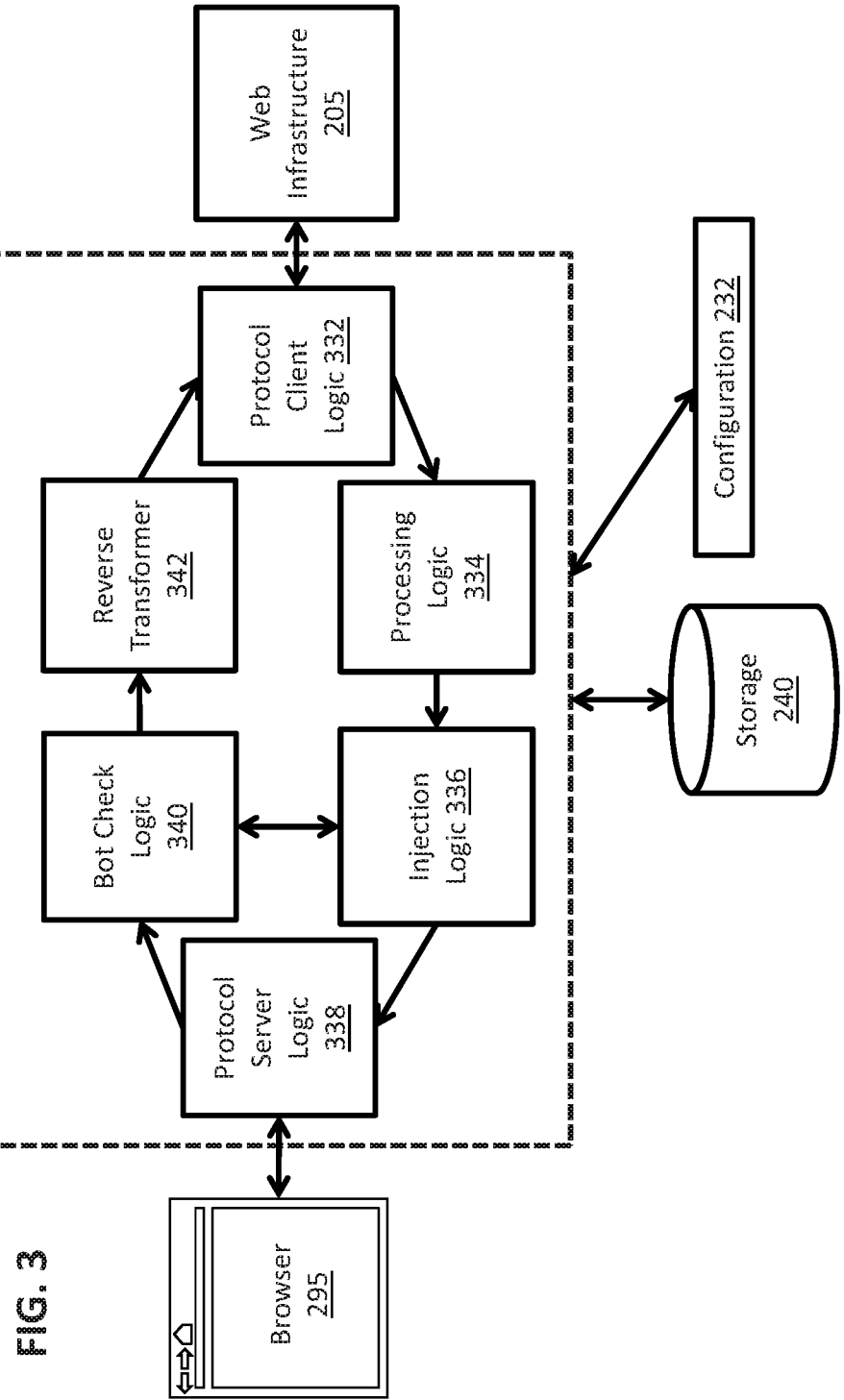
FIG. 3 illustrates detailed view of an intermediary computer in an example embodiment.

4.0 Example Network Topology that Detects Whether a Browser is a Legitimate Browser or a Bot FIG. 2 illustrates a computer system comprising a browser, an intermediary computer, and a web infrastructure in an example embodiment. Referring first to FIG. 2, system 200 includes web infrastructure 205, client computer 299, intermediary computer 230, storage 240, and configuration 232 distributed across a plurality of interconnected networks.

A "computer" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

While each of the components listed above is illustrated as if running on a separate, remote computer from each other, one or more of the components listed above may be part of or executed on the same computer. For example, intermediary computer 230, configuration 232, storage 240, or web infrastructure 205 may be executed on the same computer, local area, or wide area network. Additionally or alternatively, intermediary computer 230 may be a proxy server or layer for web infrastructure 205. Additionally or alternatively, intermediary computer 230 may be in line between a router and web infrastructure 205, such that intermediary computer 230 may intercept all network data sent to, or sent from, web infrastructure 205 over one or more protocols. Additionally or alternatively, intermediary computer 230, or one or more modules comprising intermediary computer 230 discussed herein, may be a software layer between, or executed on, web infrastructure 205 or a component of web infrastructure 205. Additionally or alternatively, intermediary computer 230, or one or more modules comprising intermediary computer 230 discussed herein, may be part of a server-side application that responds to requests over one or more standard or proprietary protocols, such as HTTP or any other protocol.

4.1 Web Infrastructure

Web infrastructure 205 may comprise one or more server computers that receive requests for data from users through one or more computers, such as client computer 299 or intermediary computer 230. Web infrastructure 205 may respond by sending data to the browser that sent the request. As illustrated in FIG. 2, the data sent from web infrastructure 205 may include instructions: HTML, JavaScript, and CSS 210. The one or more computers in web infrastructure 205 may, but need not, be owned or managed by one or more independent entities and may span across one or more computer networks.

A server computer may be a computer that receives requests for data and responds with data. For example, a web server computer may be an HTTP-based computer that receives HTTP requests and responds with data comprising HTML, CSS, or JavaScript instructions. Additionally or alternatively, a server computer may respond with data that references data on other server computers in, or outside of, web infrastructure 205.

4.2 Intermediary Computer

Intermediary computer 230 may be an intermediary that may intercept instructions sent from web infrastructure 205, parse or execute one or more of the intercepted instructions, modify the intercepted instructions, generate or add new instructions, and send the modified or new instructions to a client computer using one or more protocols. For example, intermediary computer 230 may intercept HTML, JavaScript, and CSS 210, generate modified HTML, JavaScript, and CSS 290 by adding detection instructions, and send modified HTML, JavaScript, and CSS 290 to browser 295 using a HyperText Transfer Protocol ("HTTP"). Intermediary computer 230 may intercept a request from browser 295, generate a new or modified request, and send the new or modified request to web infrastructure 205 using one or more protocols.

Intermediary computer 230 may be a server computer that one or more domain name servers or other elements of the domain name system ("DNS") identify in DNS records as a destination network address associated with one or more internet domain names. Accordingly, intermediary computer 230 or intermediary computer 230 may receive requests sent to the one or more domains from a browser or bot. Based on using DNS to resolve the domain name in a request to a network address, intermediary computer 230 may forward the request, or a modified request, to a server computer in web infrastructure 205, such as original web server computer 302.

In FIG. 2, intermediary computer 230 is programmed to send instructions to, and receive requests from, a particular type of client application: browser 295. However, in an embodiment, intermediary computer 230 may be programmed to send instructions to, receive requests from, or open sockets with browsers or bots.

FIG. 3 illustrates detailed view of an intermediary computer in an example embodiment. In FIG. 3, intermediary computer 230 comprises protocol client logic 332, processing logic 334, injection logic 336, protocol server logic 338, bot check logic 340, and reverse logic 342. In an embodiment, each functional unit or "logic" may be a set of computer executable instructions, which when executed by a computer cause the computer to perform one or more of the functions or operations discussed herein. In FIG. 3, intermediary computer 230 comprises more than one function unit or logic executed on the same computer. In an embodiment, one or more functional units may be part of the same logic, software module, or package. In an embodiment, one or more of the functional units may be executed on one or computer computers working in concert and communicatively coupled over one or more computer networks. In an embodiment, each of the functional units of intermediary computer 230 may be implemented using any of the techniques further described herein in connection with FIG. 5; for example, the intermediary computer 230 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices or modules being communicatively coupled, each of the computers, devices, modules, storage, and configurations may be communicatively coupled with each other.

4.2.1 Protocol Client Logic

Protocol client logic 332 may intercept data over any standard or proprietary protocol. For example, protocol client logic 332 may intercept data, such as web page, over HTTP.

4.2.2 Processing Logic

Processing logic 334 may process instructions intercepted by protocol client logic 332. Processing one or more instructions may comprise parsing or executing the one or more instructions. Accordingly, processing logic 334 may generate one or more data structures in memory that represent, and correspond to, one or more objects in a web page received from protocol client logic 332. After processing the instructions, processing logic 334 may notify injection logic 336 to begin rendering instructions based on the one or more data structures created by processing logic 334 that are currently in memory.

Processing logic 334 may make requests for additional data. For example, if instructions received from protocol client logic 332 reference additional instructions stored on another web server, then processing logic 334 may request the additional instructions through protocol client logic 332.

4.2.3 Injection Logic

Injection logic 336 may inject one or more browser detection instructions into a web page, which when executed cause the browser to perform one or more operations and send results back to intermediary computer 230. Injection logic 336 may inject one or more browser detection instructions into a web page based on the one or more data structures in memory, data in configuration 232 or storage 240, or on how, or whether, a browser on a client computer responds, or does not respond, to the browser detection instructions. Injecting or adding instructions into a web page may mean prepending, inserting, or appending instructions into the web page or file. Additionally or alternatively, injecting instructions into a web page may mean generating one or more new files with the new instructions and prepending, inserting, or appending one or more references to the one or more new files in one or more files that originally defined the web page.

Injection logic 336 may send or store data in bot check logic 340 or storage 240 indicating which detection tests or instructions were sent to each browser or client computer or which responses to expect from each browser or client computer. Injection logic 336 may send or store data in storage 240 indicating which countermeasures were sent to each browser or client computer.

Additionally or alternatively, injection logic 336 may operate on the objects created by processing logic 334 and inject countermeasure instructions, which if executed are configured to cause a browser to perform or overcome one or more countermeasures, such as polymorphism, dynamic credentials, or any countermeasure discussed in U.S. application Ser. No. 14/099,437, filed on Dec. 6, 2013, U.S. application Ser. No. 14/159,374, filed on Jan. 20, 2014, U.S. application Ser. No. 14/175,923, filed on Feb. 7, 2014, U.S. application Ser. No. 14/218,598, filed on Mar. 18, 2014, U.S. application Ser. No. 14/290,805, filed on May 29, 2014, U.S. application Ser. No. 14/290,835, filed on May 29, 2014, U.S. application Ser. No. 14/338,207, filed on Jul. 22, 2014, U.S. Provisional Application Ser. No. 61/600,145, filed on Feb. 17, 2012, U.S. application Ser. No. 13/527,025, filed on Jun. 18, 2012, U.S. application Ser. No. 14/481,835, filed on Sep. 9, 2014, U.S. application Ser. No. 14/481,867, filed on Sep. 9, 2014, which are incorporated by reference herein.

Injection logic 336 may operate on objects or render instructions based on one or more configurations specified in configuration 232. Injection logic 336 may send the rendered instructions to one or more client computers through protocol server logic 338.

4.2.4 Protocol Server Logic

Protocol server logic 338 may receive the instructions generated by injection logic 336 and send the generated instructions to client computer 299. Additionally or alternatively, protocol server logic 338 may intercept requests from client computer 299 and forward the requests to bot check logic 340.

4.2.5 Bot Check Logic

Bot check logic 340 may receive the results from one or more detection tests and determine whether the browser that sent the results is a browser or a bot. The results may be received with a request for additional data, such as another web page, or asynchronously. Additionally or alternatively, based on data from injection logic 336 or in storage 240 indicating that a particular browser detection test was sent to a particular browser or client computer, if bot check logic 340 does not receive data indicating that the particular browser or client computer did not execute the particular browser detection test within a particular amount of time or before receiving a request for another web page that does not include data from one or more detection tests, then bot check logic 340 may determine that the particular browser is a bot.

Bot check logic 340 may send data to injection logic 336, or store data in storage 240, indicating whether a particular browser is a legitimate browser or a bot. If injection logic 335 receives data from bot check logic 340, or storage 240, indicating that a particular browser on a client computer is a legitimate browser, then injection logic 336 may inject fewer, or less aggressive, detection tests or countermeasures in web pages sent to the particular browser. If injection logic 335 receives data from bot check logic 340, or storage 240, indicating that a particular browser on a client computer is a bot, then injection logic 336 may inject more, or more aggressive, detection tests or countermeasures in web pages sent to the particular browser.

4.2.6 Reverse Logic

Reverse logic 342 may translate requests intercepted by protocol server logic 338, which may be based on instructions generated by injection logic 336, into requests that would have been generated by browser 295 had browser 295 received the original instructions sent from web infrastructure 205. For example, if a request from browser 295 includes a dynamic credential generated by bot check logic 340, then reverse logic 342 may generate a new request that does not include the dynamic credential. Reverse logic 342 may send the new request web infrastructure 205 through protocol client logic 332 on behalf of browser 295.

4.2.7 Configurations

Configuration 242 may be a database, a configuration file, or any other system that stores configurations: settings, preferences, or protocols. Configuration 242 may store more than one configuration for one or more web servers in web infrastructure 205. For example, configuration 232 may include data that indicates data or web pages from one or more server computers in web infrastructure 205 may, or need not, be injected with browser detection tests or instructions. Additionally or alternatively, configuration 232 may include data that indicates data or web pages from one or more server computers in web infrastructure 205 may, or need not, be injected with instructions which perform one or more countermeasures.

Configuration 232 may be modified by a user or administrator through one or more computers, such intermediary computer 230, a computer in web infrastructure 205, or any other computer. The one or more computers may present the user with an interface that presents the user with a site map. The site map may comprise a graph, wherein the nodes correspond to pages and the edges between the nodes correspond to links.

The user may update configuration 232, through the interface, by selecting which links or pages to be "public" and which links or pages are "protected". A public web page may be a web page that need not include one or more detection tests or countermeasures or may be requested by any browser including a bot. A protected web page may include instructions that perform one or more browser detection tests or countermeasures or may be restricted by the server computer if the server computer has determined that the browser requesting the protected web page is a bot, or has not determined that the browser is a legitimate browser.

For purposes of illustrating a clear example, assume configuration 232 comprises data indicating that the help page of a web site is public, but a user profile page is protected. If intermediary computer 230 receives a request for the help page, then intermediary computer 230 may send the help page to the browser without intermediary computer 230 determining, or regardless of whether intermediary computer 230 has determined, that the browser is a bot or a legitimate browser. If intermediary computer 230 receives a request for the user profile page from a browser that intermediary computer 230 has determined is a bot, then intermediary computer 230 may perform a negative action. If intermediary computer 230 receives a request for the user profile page from a browser that intermediary computer 230 has determined is legitimate, then intermediary computer 230 may send the user profile page to the browser; the user profile page need not include detection tests. If intermediary computer 230 receives a request for the user profile page from a browser that the server computer has not determined is a bot or a legitimate browser, then intermediary computer 230 may send a web page that includes detection tests to determine whether the browser is a bot or a legitimate browser. The web page may be the user profile page if intermediary computer 230 storage 240 has data indicating that the browser has not requested a protected page before.

4.2.8 Storage

Storage 240 may store one or more expected results from one or more browsers. For example, storage 240 may include a repository of outputs from one or more particular browsers or types of browsers.

Intermediary computer 230 or bot check logic 340 may store data in storage 240 indicating that a browser is a particular browser or type of browser. Data that identifies a browser and indicates whether the browser is a particular browser or type of browser may be referred to herein as identification data. For example, if bot check logic 340 determines that browser 295 is a legitimate browser based on results from one or more detection tests, then bot check logic 340 may store data in storage 240 indicating that browser 295 is a legitimate browser. In response to a request for a web page, bot check logic 340 may retrieve data indicating that browser 295 is a legitimate browser and forward the request to web infrastructure 205; furthermore, injection logic 336 may send the requested web page to browser 295 without adding any detection tests. In contrast, if bot check logic 340 determines that browser 295 is a bot based on results from one or more detection tests, then bot check logic 340 may store data in storage 240 indicating that browser 295 is a bot. In response to a request for a protected web page, bot check logic 340 may retrieve data indicating that browser 295 is a bot and terminate the request without forwarding the request to web infrastructure 205. A browser in storage 240 may be identified by one or more values or attributes associated with the browser or the client computer that the browser is executed on, such as a MAC address or an IP address assigned to the client computer.

Bot check logic 340 may clear or refresh data in storage 240. For example, bot check logic 340 may delete records in storage 240 indicating that a browser is a legitimate browser or a bot after a particular amount of time since the records were created. The particular amount of time may be defined by a user or administrator and stored in configuration 232.

Bot check logic 340 may update the expected output of browsers in storage 240 from browsers that are deemed to be the same browser or type of browser. For example, if bot check logic 340 determines that a browser is a bot, then bot check logic 340 may store the particular output from one or more detection tests generated by the browser in storage 240 and indicate that the output is from a bot. In response to receiving new output from a new browser that matches the particular output from the one or more detection tests, then bot check logic 340 may determine that the new browser is a bot.

Storage 240 may be a database, a configuration file, or any other system or data structure that stores data. In FIG. 2, storage 240 is illustrated as if a separate computer from intermediary computer 230. Additionally or alternatively, storage 240 may be a data structure stored in memory on the one or more computers comprising intermediary computer 230. Additionally or alternatively, storage 240 may, at least in part, be a data structure stored in shared memory between one or more intermediary computers. Additionally or alternatively, intermediary computer 230 may, at least in part, be stored in volatile or non-volatile memory.

4.3 Browser

Browser 295 may be a browser as described herein and executed on a client computer, such as client computer 299. Additionally or alternatively, browser 295 may be a bot comprising one or more of the components traditionally found in a browser.

5.0 Process Overview

In an embodiment, a data processing method may be configured to intercept instructions from a server computer that are directed toward a browser, injection one or more instructions which when executed cause the client computer to perform or overcome one or more browser detection tests or countermeasures. In an embodiment, if results from the one more browser detection instructions indicate that a browser is a bot, or is more likely to be a bot, then the processing method may be configured to inject one or more instructions, which when executed cause the browser to perform or overcome one or more additional or aggressive browser detection tests or countermeasures, or send a response to a client computer. In an embodiment, if results from the one more browser detection instructions indicate that a browser is a legitimate browser, or is more likely to be a legitimate browser, then the method may be configured to not inject one or more instructions, which when executed cause the browser to perform one or more countermeasures or additional browser detection tests or, or send a response to a client computer. Various embodiments may use standard web protocols, such as HTTP, or standard web-based instructions, such as HTML or JavaScript. Additionally or alternatively, other standard or proprietary protocols may be used. Additionally or alternatively, other standard or proprietary instructions may be used.

5.1 Intercepting Instructions from a Content Server Computer

Figure 4:
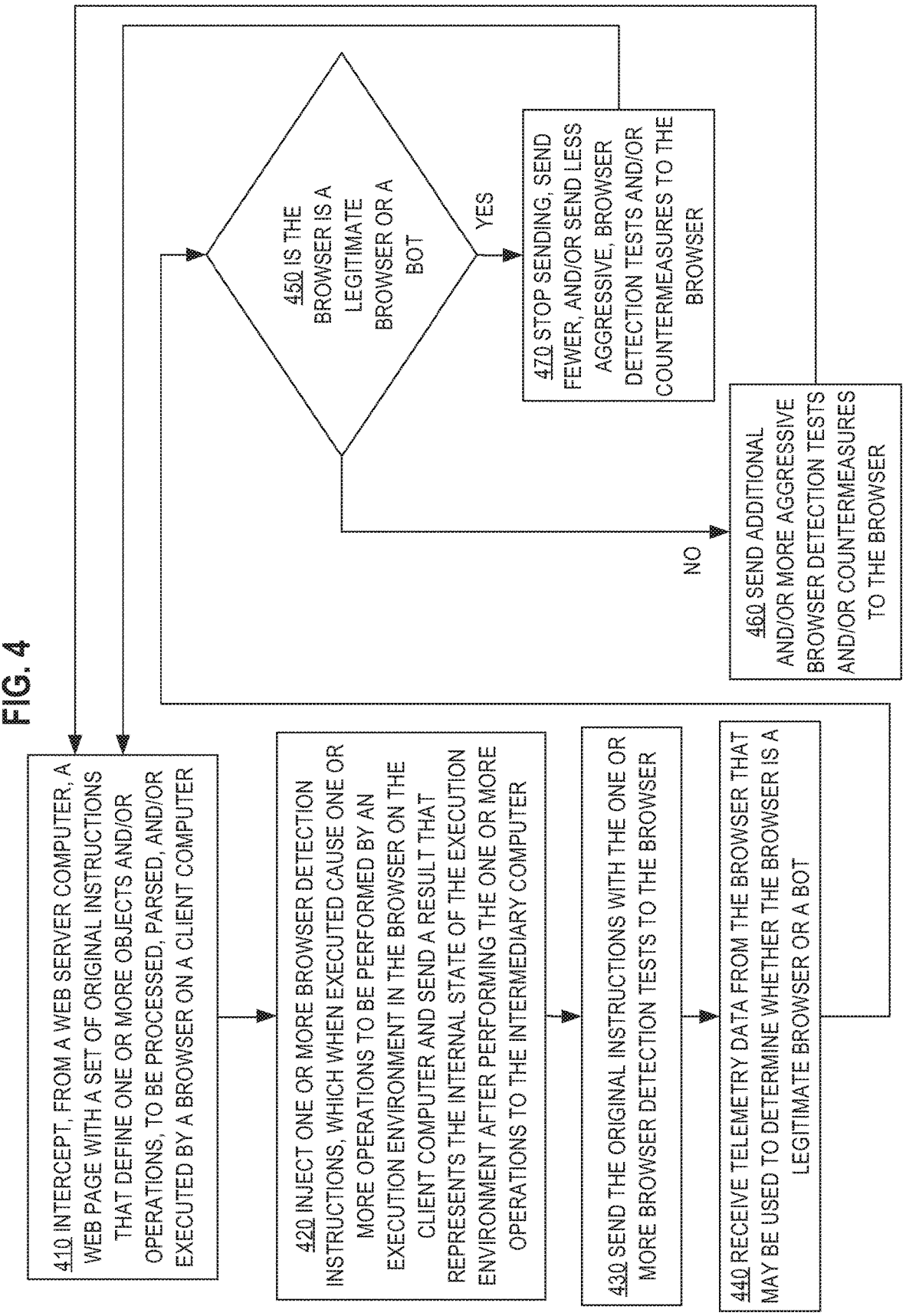
FIG. 4 illustrates a process for determining whether a browser is a legitimate browser or a bot, and adjusting the number of browser detection tests or countermeasures used, in an example embodiment.

FIG. 4 illustrates a process for determining whether a browser is a legitimate browser or a bot, and adjusting the browser detection tests or countermeasures used, in an example embodiment. In step 410, an intermediary computer intercepts, from a web server computer, a web page with a set of instructions that define one or more objects or operations, to be processed, parsed, or executed by a browser on a client computer. For example, protocol client logic 332 may receive a web page from web infrastructure 205. The web page may comprise HTML, CSS, JavaScript, or any other type of instructions.

5.2 Injecting Browser Detection Tests

In step 420, the intermediary computer injects one or more browser detection instructions, which when executed cause one or more operations to be performed by an execution environment in the browser on the client computer and send a result that represents the internal state of the execution environment after performing the one or more operations to the intermediary computer. For purposes of illustrating a clear example, assume that the web page received in the previous step comprises HTML, CSS, and JavaScript instructions. Processing logic 334 may parse the instructions. Injection logic 336 may inject one or more browser detection instructions, such as JavaScript instructions, in the web page, which when executed by a browser cause the browser to perform one or more browser detection tests.

In step 430, the intermediary computer sends the one or more browser detection tests to the browser. For example, injection logic 336 may send the web page or the injected instructions in step 420 to browser 295 through protocol server logic 338.

5.3 Determining Whether a Browser is a Legitimate Browser or a Bot

In step 440, the intermediary computer receives data from the browser that may be used to determine whether the browser is a legitimate browser or a bot. For example, browser 295 may execute the injected instructions and return data resulting from execution of the injected instructions to intermediary computer 230. The data may be received by bot check logic 340 through protocol server logic 338.

In step 450, the intermediary computer determines whether the browser is a legitimate browser or a bot. Additionally or alternatively, the intermediary computer may determine whether the browser is more or less likely to be a legitimate browser or a bot.

Bot check logic 340 may determine based, at least in part, on the results from one or more browser detection tests whether browser 295 is a legitimate browser or a bot. Additionally or alternatively, bot check logic 340 may determine based, at least in part, on the results from the one or more browser detection tests which browser, or type of browser, that browser 295 may or may not be. For example, bot check logic 340 may receive a stack trace from browser 295. Bot check logic 340 may check for matching or similar stack traces stored in storage 240. If bot check logic 340 determines that a stack trace matches a stack trace in storage 240, then bot check logic 340 may determine that browser 295 is the browser or type of browser associated with the matching stack trace.

The expected results for each browser or type of browser may be stored in storage 240 by an administrator, through one or more computers. Additionally or alternatively, the browser detection tests may be executed by one or more known browsers one or more times, and the result(s) from the browser detection tests may be stored in storage 240 and associated with the browser or type of browser that generated the result.

If a bot is preprogrammed to spoof a legitimate browser by imitating one or more results that would be generated if the bot was a legitimate browser, then the results received from one or more browser detection test results may match or be similar to the expected results from a legitimate browser. However, other results may fail to match, or be similar to, the same legitimate browser's results. Accordingly, if bot check logic 340 receives results from a browser that matches the results of more than one legitimate browsers' results, then bot check logic 340 may determine that the browser is a bot trying to spoof a legitimate browser. Additionally or alternatively, if bot check logic 340 receives results from a browser that matches the results of more than one legitimate browsers' results, then bot check logic 340 may determine that the browser is more likely to be a bot.

If bot check logic 340 receives data from browser 295 one or more times that matches, or is similar to, the expected results from a particular browser or type of browser, then bot check logic 340 may determine that browser 295 is, or is more likely to be, that particular browser. The particular browser may be a legitimate browser or a bot.

If bot check logic 340 determines that a browser is a bot, or is more likely to be a bot, then control may pass to step 460. If bot check logic 340 determines that a browser is a legitimate browser, or is more likely to be a legitimate browser, then control may pass to step 470.

In an embodiment, if an intermediary computer receives browser detection test results from a browser and is unable to match the browser detection test results with pre-generated or pre-stored results associated with a particular browser or type of browser, then the intermediary computer may determine that the browser is a bot, or is more likely to be a bot. Additionally or alternatively, if an intermediary computer receives browser detection test results from a browser and is unable to match the browser detection test results with pre-generated or pre-stored results associated with a particular browser or type of browser, then the intermediary computer may store the browser detection test results in storage 240 and associate the browser detection test results with a new browser or type of browser. An administrator may review the browser detection test results and determine whether the new browser or type of browser should be classified as a legitimate browser or a bot.

In an embodiment, in step 420, injection logic 336 may generate a new file and modify the web page to reference the new file. The new file may comprise one or more browser detection instructions. The injection logic 336 may send the modified web page to the browser. If the browser fails to request or download the new file, then intermediary computer 230 may determine that the browser is a bot. Injection logic 336 may cache the new file. When a new web page is intercepted, injection logic may insert or append a reference into the new web page that points to the cached file. Additionally or alternatively, injection logic 336 may update the new file with new, different, or modified instructions that cause a browser to perform new, different, or modified browser detection tests.

5.3.1 Testing with Dynamic Browser Detection Tests

Injection logic 336 may inject one or more dynamic browser detection tests into a web page. A dynamic browser detection test comprises one or more browser detection instructions that are unique to the particular the web page that the browser detection instructions are injected into. For example, for a stack trace browser detection test, one or more aliases assigned to one or more functions used to generate a stack trace may be different each time injection logic 336 injects the stack track browser detection test into a web page. For purposes of illustrating a clear example, notice that two aliases in Snippet 7 were assigned to two functions that would be identified in a stack trace if browser 295 executed Snippet 7 in a web page: "F1" and "F2". Injection logic 336 may inject a dynamic stack trace browser test by changing one or more aliases assigned to one or more of the functions in Snippet 7 each time injection logic 336 injects Snippet 7 in a web page and sends the web page to browser 295. Injection logic 336 may store the one or more changed aliases in storage 240 and associate the changed aliases with browser 295 or an identifier associated with browser 295, such as an IP address of the client computer that browser 295 is being executed on. If bot check logic 340 receives a stack trace in a subsequent request from browser 295 that includes the changed aliases and the identifier associated with browser 295 in storage 240, then bot check logic 340 may determine that browser 295 is a legitimate browser. If bot check logic 340 receives a stack trace in a subsequent request from browser 295 that includes the identifier associated with browser 295 in storage 240, but not the changed aliases, then bot check logic 340 may determine that browser 295 is a legitimate browser.

5.4 Responding to a Browser that is Determined to be a Bot

In step 460, the intermediary computer sends additional or more aggressive browser detection tests or countermeasures to the browser. For example, injection logic 336 may send browser 295 one or more browser detection instructions, which when executed, cause browser 295 to generate an alert or popup to be displayed for a user to suppress, and report back to intermediary computer 230 how much time elapsed from when the alert was presented until the alert was suppressed. Causing an alert to be presented to a user may interrupt the workflow of a user using a web page. Accordingly, a browser detection test that causes an alert to be presented to a user may be considered a more aggressive browser detection test other tests.

In response to determining that a browser, such as browser 295, is a bot, intermediary computer 230 may stop responding to requests for data from browser 295. Additionally or alternatively, in response to determining that a browser is a bot, bot check logic 340 or injection logic 336 may perform one or more countermeasures discussed or referenced herein. For example, injection logic 336 may send a bot one or more instructions, which when executed by the bot, cause the bot to write a massive amount of data to persistent storage by continuously appending a string to one or more persistently stored files, which may hamper or stop the bot, or the underlying computer, from performing. An intermediary computer need not inject countermeasures into a web page that is sent to a particular browser on a particular client computer, until after the intermediary computer determines that a particular browser is, or is more likely to be, a bot.

Bot check logic 340 may record data in storage 240 indicating that browser 295 is, or is likely to be, a bot. For example, bot check logic 340 may record the IP address, mac address, or any other identifier for browser 295, or the computer that browser 295 is executed on, in storage 240 and associate data with the identifier that indicates browser 295 is an instance of a known bot. Bot check logic 340 may send data to one or more web server computers, such as web infrastructure 205, indicating that browser 295, or the client computer that browser 295 is being executed on, is, or is likely to be, a bot.

Injection logic 336 may send additional browser detection tests or countermeasures to browser 295 by injecting the additional browser detection test or countermeasures into subsequently intercepted web pages from web infrastructure 205 that are send to browser 295. Additionally or alternatively, injection logic 336 may asynchronously send additional browser detection tests or countermeasures to browser 295 through AJAX or another programming language, set of instructions, or protocol.

5.5 Responding to a Browser that is Determined to be a Legitimate Browser

In step 470, the intermediary computer may stop sending, send fewer, or send less aggressive, browser detection tests or countermeasures to the browser. For example, if browser 295 is determined to be a legitimate browser, injection logic 336 may stop sending browser detection instructions, inject fewer countermeasures, or stop injecting countermeasures in subsequent web pages sent to browser 295.

In an embodiment, in response to determining browser 295 is more likely to be a particular legitimate browser, and before ceasing to inject countermeasures into web pages sent to browser 295, injection logic 336 may send one or more aggressive browser detection tests. If browser 295 sends results back that match the expected results for the more aggressive browser detection test associated with particular legitimate browser, then in response, injection logic 336 may stop injecting browser detection tests or countermeasures into web pages sent to browser 295 for at least a particular amount of time.

Bot check logic 340 may record data in storage 240 indicating that browser 295 is, or is likely to be, a legitimate browser. For example, bot check logic 340 may record the IP address, mac address, or any other identifier for browser 295, or the computer that browser 295 is executed on, in storage 240 and associate data with the identifier that indicates browser 295 is a particular legitimate browser. Bot check logic 340 may send data to one or more web server computers, such as web infrastructure 205, indicating that browser 295, or the client computer that browser 295 is being executed on, is, or is likely to be, a bot.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired or program logic to implement the techniques.

Figure 5:
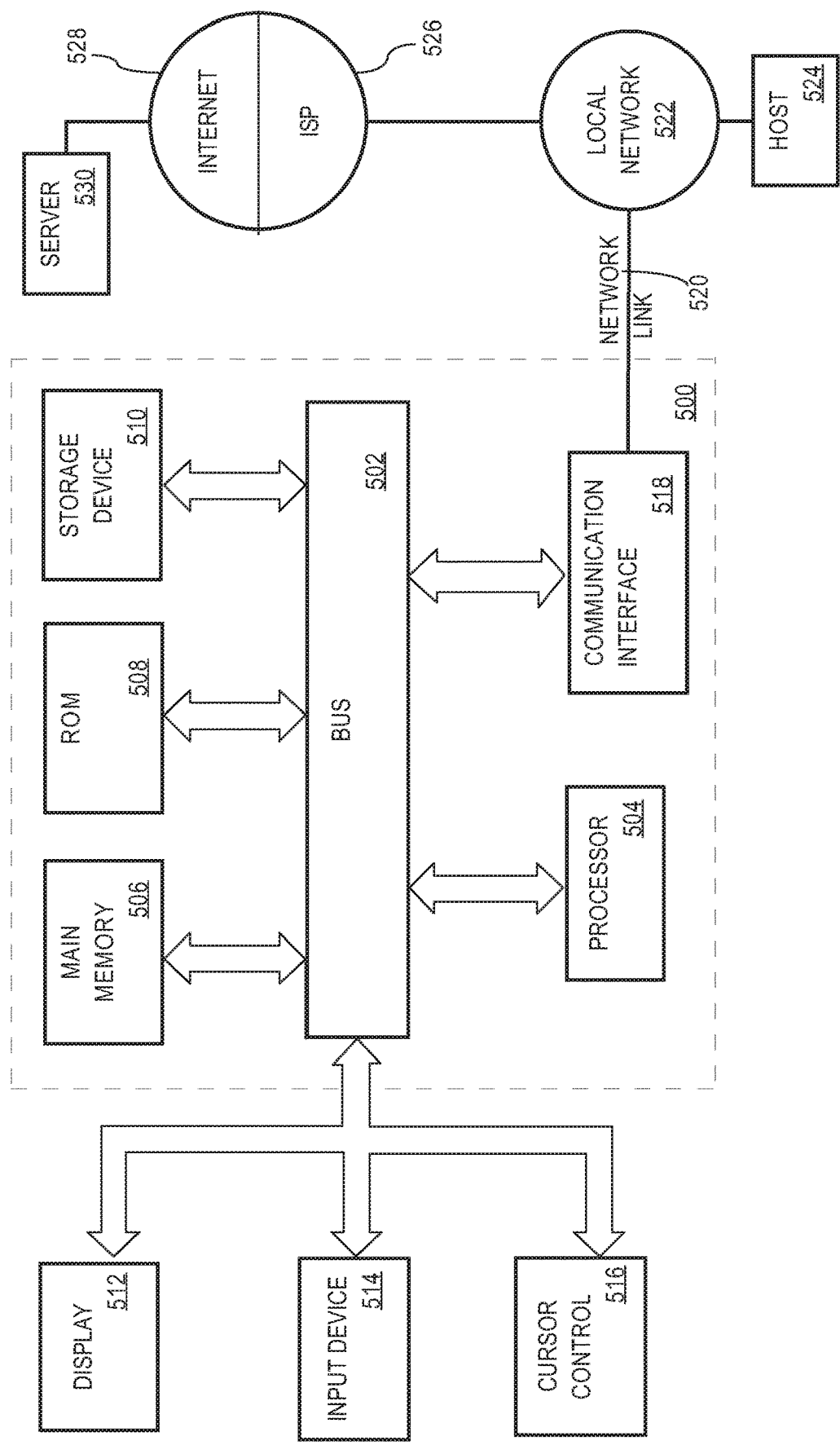
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, or stored in storage device 510, or other non-volatile storage for later execution.

7.0 Other Aspects of Disclosure

Using the networked computer arrangements, intermediary computer, or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, or exploitation of vulnerabilities, are frustrated because object identifiers or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system configured to improve security of server computers interacting with client computers, comprising:
a memory comprising processor logic;
one or more processors coupled to the memory, wherein the one or more processors execute the processor logic, which causes the one or more processors to:
send one or more browser detection instructions to a browser executing on a client computer, wherein the one or more browser detection instructions, when executed, cause one or more operations to be performed by an execution environment of the browser;
wherein the one or more operations are configured to cause the execution environment to generate a result that includes, at least, a stack trace that represents an internal state of the execution environment after performing the one or more operations and send the result to the computer system;
receive, from the client computer, a request from the browser that includes the result representing the internal state of the execution environment;
determine, based, at least in part, on the stack trace, whether to block the request.

2. The computer system of claim 1, wherein the processor logic further causes the one or more processors to, in response to determining to block the request, terminate the request.

3. The computer system of claim 1, wherein the processor logic further causes the one or more processors to, in response to determining to block to the request, send a response that includes one or more countermeasures.

4. The computer system of claim 1, wherein the processor logic further causes the one or more processors to, in response to determining to not block the request, send a response that does not include the one or more browser detection instructions.

5. The computer system of claim 1, wherein the one or more operations are further configured to cause the execution environment to generate an error message, wherein the result further includes the error message, and wherein determining whether to terminate the request is further based on the error message.

6. The computer system of claim 1, wherein the one or more operations are further configured to cause the execution environment to determine whether one or more objects are defined with one or more aliases, wherein the result includes data that indicates whether the one or more objects are defined with the one or more aliases, and wherein determining whether to terminate the request is further based on the data that indicates whether the one or more objects are defined with the one or more aliases.

7. The computer system of claim 1, wherein the one or more operations are configured to cause the execution environment to, at least, violate one or more protection mechanisms, and the result comprises data that indicates whether the execution environment violated the one or more protection mechanisms.

8. The computer system of claim 1, wherein the one or more operations are configured to cause the execution environment to, at least, determine whether one or more plugins or libraries are installed, and the result comprises data that indicates which of the one or more plugins or libraries are installed.

9. The computer system of claim 1, wherein the one or more operations are configured to cause the execution environment to, at least, generate an alert and an amount of time from when the alert was generated until the alert was suppressed, and the result comprises data that indicates the amount of time that passed from when the alert was generated until the alert was suppressed.

10. The computer system of claim 1, wherein the one or more operations are configured to cause the execution environment to, at least, generate an alert and record whether the alert was suppressed, and the result comprises data that indicates whether the alert was suppressed.

11. A method for improving security of server computers interacting with client computers comprising:
sending one or more browser detection instructions to a browser executing on a client computer, wherein the one or more browser detection instructions, when executed, cause one or more operations to be performed by an execution environment of the browser;
wherein the one or more operations are configured to cause the execution environment to generate a result that includes, at least, a stack trace that represents an internal state of the execution environment after performing the one or more operations and send the result to a server computer;
receiving, from the client computer, a request from the browser that includes the result representing the internal state of the execution environment;
determine, based, at least in part, on the stack trace, whether to block the request.

12. The method of claim 11 further comprising, in response to determining to block the request, terminate the request.

13. The method of claim 11 further comprising, in response to determining to block to the request, send a response that includes one or more countermeasures.

14. The method of claim 11 further comprising, in response to determining to not block the request, send a response that does not include the one or more browser detection instructions.

15. The method of claim 11, wherein the one or more operations are further configured to cause the execution environment to generate an error message, wherein the result further includes the error message, and wherein determining whether to terminate the request is further based on the error message.

16. The method of claim 11, wherein the one or more operations are further configured to cause the execution environment to determine whether one or more objects are defined with one or more aliases, wherein the result includes data that indicates whether the one or more objects are defined with the one or more aliases, and wherein determining whether to terminate the request is further based on the data that indicates whether the one or more objects are defined with the one or more aliases.

17. The method of claim 11, wherein the one or more operations are configured to cause the execution environment to, at least, violate one or more protection mechanisms, and the result comprises data that indicates whether the execution environment violated the one or more protection mechanisms.

18. The method of claim 11, wherein the one or more operations are configured to cause the execution environment to, at least, determine whether one or more plugins or libraries are installed, and the result comprises data that indicates which of the one or more plugins or libraries are installed.

19. The method of claim 11, wherein the one or more operations are configured to cause the execution environment to, at least, generate an alert and an amount of time from when the alert was generated until the alert was suppressed, and the result comprises data that indicates the amount of time that passed from when the alert was generated until the alert was suppressed.

20. The method of claim 11, wherein the one or more operations are configured to cause the execution environment to, at least, generate an alert and record whether the alert was suppressed, and the result comprises data that indicates whether the alert was suppressed.

\* \* \* \* \*